United States Patent
Kirkpatrick

(12) 
(10) Patent No.: US 7,249,090 B1
(45) Date of Patent: Jul. 24, 2007

(54) METHOD AND SYSTEM FOR DISTRIBUTING RECEIVABLES

(75) Inventor: Timothy Gephart Kirkpatrick, Boca Raton, FL (US)

(73) Assignee: Loantrade, Inc., Boca Raton, FL (US)

( * ) Notice: Subject to any disclaimer, the term of this patent is extended or adjusted under 35 U.S.C. 154(b) by 1178 days.

(21) Appl. No.: 09/704,303

(22) Filed: Nov. 2, 2000

(51) Int. Cl.
*G06Q 40/00* (2006.01)
(52) U.S. Cl. .................. 705/38; 705/35; 705/36 R
(58) Field of Classification Search .................. 705/35, 705/37, 40, 38
See application file for complete search history.

(56) References Cited

U.S. PATENT DOCUMENTS

| | | | | |
|---|---|---|---|---|
| 6,990,467 B1 | * | 1/2006 | Kwan | 705/37 |
| 2001/0049658 A1 | * | 12/2001 | Hays | |
| 2002/0023694 A1 | * | 2/2002 | Kucera et al. | 148/240 |
| 2002/0120570 A1 | * | 8/2002 | Loy | |
| 2003/0050884 A1 | * | 3/2003 | Barnett | 705/35 |

FOREIGN PATENT DOCUMENTS

EP  1130529 A1 * 5/2001

OTHER PUBLICATIONS

U.S. Appl. No. 60/207,951.*
U.S. Appl. No. 60/224,706.*
U.S. Appl. No. 60/191,901.*
Kincaid, Timothy J., Creidt World, St. Louis: Mar./Apr. 1994. vol. 82, Issue 4; p. 14, 4 pgs.*
Kirkpatrick, T., "Purchasing Distressed Loans", *Collector*, Apr. 1992, pp. 26-29.
Reilly, P. M., "Going Once, Going Twice, Sold!", *Collections and Credit Risk*, Mar. 2000, pp. 89-92.
Waggoner, D. J., "Barbarians at the Gate", *Collections and Credit Risk*, Jul. 2000.
Waggoner, D. J., "Debt Sales Skyrocket", *Collections and Credit Risk*, Nov. 1999.
Snyder, J., "Who's Fueling Debt Purchases?", *Collections and Credit Risk*, Jun. 1999.
Nilson, S., *The Nilson Report*, Apr. 2000.
Barron's Dictionary of Finance and Investment Terms, Fourth Edition.
Federal Reserve Board, *BHC Supervision Manual*, Section 2130.0, Dec. 1992.
New Debt Sales Concept Introduced, *Debt Sales Bulletin*, Mar. 1, 2000, issue 243.

* cited by examiner

*Primary Examiner*—Lalita Hamilton
(74) *Attorney, Agent, or Firm*—McGuirewoods LLP

(57) ABSTRACT

The method and system of the invention is directed to a process for the optional acquisition of receivables. The method of the invention, which may be characterized as an Optional Purchase Commitment ("OPC") is a process by which a potential grantee, for example a buyer, may pay for the right, but not the obligation, to acquire receivables from a grantor, for example a seller. The OPC process of the invention enables a grantor of such receivables, typically a credit grantor, to estimate the amount of its future receivables and enter into OPC agreements to convey those expected receivables under a fixed arrangement at a specific time in the future to a grantee, for example a buyer. A grantor, a grantee, or a third party acting on behalf of either a grantor or a grantee, or independently, may initiate the OPC process of the invention. The OPC process may be utilized in conjunction with existing marketing processes. The OPC process of the invention provides a time horizon or option period. This time horizon or option period is advantageous for both grantor and grantee. Further, the process of the invention may be used in a third party exchange or clearinghouse, which may be implemented utilizing a computer arrangement.

51 Claims, 12 Drawing Sheets

METHOD AND SYSTEM FOR DISTRIBUTING RECEIVABLES

1. FIELD OF THE INVENTION

The present invention relates broadly to a method and system for distributing receivables from a first entity to a second entity.

2. BACKGROUND OF THE INVENTION

The extension of credit is a principal financial underpinning to viable contemporary economic models. The extension of credit may be performed either by businesses that produce and sell goods or services, or alternatively, by financial institutions. Credit may be extended to either consumers or commercial entities. The American Collectors Association ("ACA") currently estimates the amount of U.S. consumer debt to be at $6.3 trillion and growing.

Regardless of the source of financing, inevitably some portion of all credit granted results in delinquency and default. Delinquent receivables, for example, are generally considered to be any type of extension of consumer or commercial credit for which the debtor has failed to satisfy its obligations under a payment agreement with the credit grantor. Eventually, some portion of all delinquent receivables become classified as uncollectible and are charged against, i.e., deducted from, credit grantors' financial loss reserves or income statements. Receivables reaching this status are commonly classified as "charged-off" or "written-off" debt.

To absorb the cost of bad debt and limit credit losses, credit grantors must either impose restrictive credit guidelines on all debtors, and/or raise interest rates on credit, and/or raise prices on goods and services. The ACA estimates that bad debt costs every adult in the United States more than $680 per year. Since there is a limit on how high prices or interest rates can be increased before credit grantors begin losing customers, tightening credit guidelines or raising prices or interest rates are typically credit grantors' last resort. Instead, up to the point where it is no longer cost-effective, credit grantors typically try to exhaust a number of different debt collection and recovery methods, beginning with their own internal collection efforts.

The collection of delinquent receivables is a process that typically begins with the credit grantor's own efforts. The intensity of this collection effort depends upon the availability of internal resources. Small credit grantors are limited in this effort by their financial and human resource constraints. Larger credit grantors tend to centralize collection of delinquent receivables in specialized departments. Here, specialists, legal resources and rigorous procedures are combined to enforce debtor performance, restructure payment agreements or, when receivables are secured by collateral, repossess and pursue deficiencies.

Regardless of the size of the credit grantor, most consider it a core duty to pursue the full collection of delinquent receivables, but often find it difficult to justify the expense of extensive collection efforts. The operational collection and carrying costs of such receivables can be high, and may include personnel costs; holding period costs of funding; reserve and capital coverage costs; external resource costs; direct carrying costs such as for collateral pending disposition; and indirect carrying costs including accounting, management time and examination costs. In some cases, receivable balances may be too small to be afforded the aggressive attention required to maximize internal collection results. In other cases, simple gaps in the knowledge and tenacity of the credit grantor can limit collection efforts. But in all cases, 100% collection of delinquent receivables is rarely, if ever, internally cost-justified.

After exhausting internal collection efforts, most credit grantors find it necessary, in complying with Generally Accepted Accounting Practices (GAAP) and/or controlling government regulations, to deem the receivable to be uncollectible and to charge the delinquent receivable off its books. At the time of charge-off, the credit grantor may elect to (1) continue to pursue its own internal collection efforts, (2) place the account for collection with a third party collection or legal firm, (3) sell the receivable, or (4) cease all further collection efforts.

While other options exist, usually the credit grantor's first step following charge-off is to employ a third party collector. Third party collectors are granted the right to collect on behalf of the credit grantor in return for the right to retain a specified percentage of the money collected. Compensation paid to the third party collector is therefore contingent upon and directly proportional to the success of the collector. Since third-party collection services often use specialized phone systems, computers and software designed specifically for the collection industry, they are often more effective than credit grantors at retrieving payment on delinquent accounts. Typical contingent collection agreements between the credit grantor and the collector specify compensation arrangements, standards of work effort, and the term of the agreement.

The initial third party collector to receive the charged-off receivable from the credit grantor is called a "primary collector." If the primary collector does not succeed in collecting the delinquent receivable by the end of the term of the agreement, the receivable is returned to the credit grantor. Upon receipt of the returned delinquent receivable, the credit grantor may elect to (1) pursue its own internal collection efforts, (2) place the account again for collection with another third party collection or legal firm, (3) sell the receivable, or (4) cease all further collection efforts. Should the credit grantor place the delinquent receivable with a subsequent third party collector, this collector is called a "secondary collector." Secondary collection arrangements are similar to primary arrangements in that they specify compensation arrangements, standards of work effort, and the term of the agreement. Should the secondary collector be unsuccessful at its efforts, it is common for a delinquent receivable to be placed with a third consecutive, i.e., tertiary, third party collector or, even a subsequent fourth consecutive collector if the third collector is unsuccessful.

As described above, receivables may be in a variety of forms. That is, "receivables" as used herein may include, but not be limited to, charged-off consumer receivables, charged-off commercial receivables, delinquent consumer receivables and/or delinquent commercial receivables, for example. Further, it should be appreciated that receivables may be a hybrid of these respective types of receivables, for example. That is, "receivables" as used herein may include unpaid credit with some characteristics of delinquent receivables and some characteristics of charged-off receivables, for example. In addition, it should be appreciated that "receivables" as used herein may take the form of other unpaid credit not specifically described herein.

At any point throughout the receivable collection process, another option for the credit grantor is to sell the receivables. While the sale of receivables has been in existence for years, the evolution and development of a tangible and growing marketplace with significant numbers of institutional sellers and buyers began in the early 1980's with the federal government's wholesale liquidation of insolvent banks and their receivables portfolios. When at least one notably large banking institution conducted a sale of charged-off credit card receivables in 1989, healthy and solvent financial institutions began to recognize that receivable sales represented a viable alternative to their traditional reliance on third party contingent collectors. While there is no governmental or industry repository of sales volume statistics, most trade publications estimate current sales of receivables to exceed $40 billion per year, up from less than $1 billion in 1990. These figures represent the total of individual outstanding delinquent or charged-off balances at the time of sale. Portfolios of receivables offered for sale can range in size from less than one hundred thousand dollars to over one billion dollars in aggregate balances.

Sellers may be the original credit grantors, or alternatively, they may be buyers that are selling receivables acquired in previous purchase transactions. In either case, receivables are sold for a variety of financial and operational reasons. The seller may determine that (1) it can realize a better financial return from a sale than from the process of employing one or more consecutive third party collectors, or (2) it prefers receiving cash in a lump sum at one time rather than receiving smaller incremental amounts from a third party collection process that may take years to complete, or (3) it determines that the sale of receivables will enable it to reduce its own collection overhead, or (4) its own inventory of receivables has increased via merger or rapid growth at a pace beyond its own internal collection capability, or (5) many buyers rely on their ability to immediately sell smaller subsets of acquired portfolios' receivables to other buyers. This disposition process, also known as "reselling", enables the original buyers to recapture part or all of their initial purchase capital and to dispose of certain subsets of portfolios that do not fit well into their standard collection processes. Reselling works well for both parties to the transaction because secondary buyers may either find more value per account in a subset than they did in an entire portfolio, or they may lack sufficient capital to purchase an entire portfolio themselves.

Buyers of receivables, like third party collectors, typically are specialists at collection. Buyers may themselves be third party collectors, or other credit grantors that have developed very efficient collection departments, or they may be collection law firms, or companies whose primary business is purchasing receivables.

Buyers purchase receivables for a variety of financial and operational reasons that may make them more successful at collection than a seller or a seller's third party collectors. For example (1) the buyer may have superior collection cost efficiencies such as a lower collection cost per account or lower cost of capital than the seller or the seller's third party collectors, or (2) the buyer may be able to offer more attractive incentives to delinquent debtors to pay off their debt than originally permitted by the seller, or (3) the buyer's collection period time horizon may be longer than either the seller's, or the time frame of a contingent collection arrangement between the seller and its third party collector(s), or (4) the buyer may employ collection techniques that, while more effective, are not permitted by the seller due to public relations concerns.

There are two general "transaction types" commonly used for the sale of receivables. These two transaction types include a "bulk" sale process and a "forward flow" sale process. In either transaction type, the seller may combine many individual receivables into a portfolio ("portfolio") composed of receivables with similar characteristics. The grouping of receivables into portfolios may be based upon characteristics such as credit type, collection history, geography, or age of delinquency, for example.

The bulk sale transaction type is by far the most prevalent type used in the marketplace and involves the aggregation of individual receivables over months or even years, i.e., during a "holding period," by the seller in anticipation of a single discrete portfolio sale event. Typically, immediately following the aggregation of receivables, the bulk seller solicits offers from potential buyers in a process, i.e., a "marketing process," that can last from one to 90 days under known practices. Immediately following the seller's receipt of an acceptable purchase offer, the delivery of the portfolio by the seller occurs simultaneously with funding by the buyer.

The forward flow sale transaction type is much less prevalent in the marketplace and involves an agreement between buyer and seller that the seller will deliver a consecutive series of receivables portfolios at future monthly, quarterly or even yearly predetermined dates. Unlike a bulk transaction involving the sale of receivables that exist at the time of sale, a forward flow sale enables the seller to establish a mandatory price for its anticipated receivables, i.e., receivables that may not exist at the time of establishing the forward flow contract.

To explain further, the sale of a portfolio of receivables may be structured as a bulk sale transaction type or a forward flow transaction type. However, the method by which a sale portfolio is offered into the marketplace may be referred to as the "marketing process", and may be used with either transaction type. The marketing process may include a competitive bid process, a request for proposal ("RFP") process, or a private negotiation process with an individual buyer or buyers, i.e., a "private placement," or utilization of a third party exchange or clearinghouse. While a seller typically initiates a marketing process, it should be noted that a buyer may initiate a purchase involving either transaction type via private negotiation or other methods with a seller.

In general, known marketing processes involve (1) some level of preparation of data pertaining to the portfolios of receivables, (2) communication of such data to one or more potential buyers, and, if successful (3) offers made by one or more potential buyers to purchase the subject portfolios.

In known processes and regardless of the process for receipt and consideration of offers, buyers' offers containing the highest price and the fewest contractual contingencies typically qualify for acceptance by sellers. The price is the amount of money a buyer is willing to pay a seller for the portfolio of receivables.

It should be appreciated that while the specific steps involved in marketing and selling bulk or forward flow transaction types may vary depending upon the specific methods employed by the seller, invariably the essential components of either type of sale include (1) an irrevocable agreement specifying performance between the seller to sell and the buyer to purchase, (2) the identification of a discrete portfolio of receivables in a bulk sale transaction type, or alternatively, the characteristics of a future portfolio in a forward flow delivery transaction type, (3) a fixed price, and (4) a delivery and funding time frame.

Further, it should be appreciated that, while principals to the transactions as described above are the sellers and buyers, i.e., the grantors and the grantees, respectively, brokers also often participate. That is, brokers often serve as intermediaries and can represent either sellers or buyers.

SUMMARY OF THE INVENTION

It should be appreciated that despite the increasing volume of receivables sales, aspects of both conventional bulk or conventional forward flow sale arrangements can be problematic for both buyers and sellers. The method of the invention overcomes many of the problems associated with the conventional processes. To further explain, the conventional bulk sale methodology, as previously stated, represents the predominant method of marketplace receivables sales. Inherent with this process are problems that limit its efficiency for market participants. Illustratively, inefficiencies with the conventional bulk sale process are described below.

One inefficiency with the conventional bulk sale process involves "holding period risk." To explain, the market value of individual receivables decreases during the bulk sale holding period because the likelihood of collecting the receivable balances diminishes over time, due to one or more of the following factors: (1) The seller may cease internal or third party collection efforts in anticipation of a bulk sale event, meaning that any contact with delinquent debtors may be lost and any payment activity may diminish. (2) The debtor may file for bankruptcy protection during the holding period, which has the effect of removing the requirement for a delinquent debtor to repay the debt. (3) All states have individual statutes of limitation which specify the amount of time that must pass from the date the debtor defaulted on the debt until the debt is no longer legally collectible, such that, should the debt remain delinquent beyond the length of time specified by the statute, the legal obligation for the debtor to repay the debt is eliminated. (4) Credit reporting agencies are required by federal statute to remove all inactive credit references, including those for delinquent or charged-off debts owed, from a debtor's credit reports after approximately seven years. If the statutory time period expires during the bulk sale holding period and a debtor's poor credit reference is eliminated from the debtor's credit report, the collector loses the leverage associated with credit reports that may motivate a debtor to make full or partial repayment of the delinquent debt. All of the above lost opportunities reduce sellers' gross collection income and their ability to receive higher competitive sale prices from buyers.

Accordingly, it should be appreciated that the inefficiencies of the known processes adversely affect sellers. However, as described in detail below, it should be appreciated that the inefficiencies of the known processes also adversely affect buyers of receivables. For example, using known processes, a buyer is not provided sufficient opportunity to prepare for a purchase of receivables, and is often excluded from participation in the market as a result.

To illustrate, another inefficiency with known processes involves capital acquisition problems. To explain, the bulk sale process typically only affords potential buyers a matter of days before they are required to commit capital to purchase individual portfolios. Many bidders therefore are either unable to participate in bulk sale offerings because of insufficient time to borrow and/or allocate capital for portfolio purchases, or they are forced to pay more for capital than would be the case under a longer time horizon. Higher costs of capital in turn reduce their ability to pay higher prices to sellers and thus be competitive in the marketplace.

A further inefficiency with known processes is related to operational planning and management. In addition to capital concerns, bulk sale buyers must manage staffing levels, computer systems, and space allocations to efficiently match the volume of purchased receivables. The lack of opportunity to plan purchases many months or years ahead limits buyers' abilities to cost effectively manage their internal operations, and in turn ultimately results in lower purchase prices paid to sellers.

Another inefficiency with known processes involves reselling limitations. To explain, the bulk sale marketing period severely limits the amount of time available for potential buyers to evaluate portfolio offering information and to arrange for possible resale of select segments of the portfolio prior to funding the purchase transaction. Consequently, resale transactions can only be negotiated after a buyer's actual commitment of sufficient capital to pay the full purchase price for the portfolio in its entirety. Under such circumstances, buyers are required to obtain or allocate more capital than would be necessary if resale transactions could be arranged prior to funding. Current bulk sale processes, therefore, limit the number of potential buyers to only those who have sufficient available capital or low cost lines of credit. The most efficient markets operate when there are minimal restrictions on availability of capital and the numbers of buyers, thereby allowing full participation and competition. The conventional bulk sale resale restraints that are now known tend to reduce the number of buyers and raise their cost of capital. These lower the buyer's ability to pay the highest competitive rates to sellers.

A further inefficiency with known processes involves the concept of "event risk". Event risk refers to the possibility that the seller will be unable to sell a portfolio of receivables at the culmination of a marketing process. Such failure may occur due to the availability of too few buyers and/or too many competing portfolios offered for sale at a particular point in time. Event risk arises in large part from the highly fragmented and decentralized nature of the market for delinquent and charged-off receivables. There is no single clearinghouse of current or future sale transaction information, no repository of sold portfolio statistics, and no state or federal governmental regulations governing the methodology of sale processes. Moreover, there are only a limited number of trade groups representing informal associations of buyers, and there are no trade groups specifically representing sellers. Consequently, participants' awareness of sale offerings in the market at any particular point in time is extremely limited, thus making it difficult for buyers to plan for acquisitions and for sellers to know when to place their portfolios into the market in order to avoid the event risk associated with competition from other sellers' offerings. As a result, buyers miss some advantageous portfolio acquisition opportunities and participate in others that are more expensive or have less collection potential. Sellers, on the other hand, may receive a lower purchase price than would otherwise be the case because they market their portfolios at the same time as other sellers.

As described above, another transaction type is the forward flow sale process. The forward flow sale process tends to mitigate, but not eliminate, some of the problems associated with the bulk sale process. For example, the forward flow sale process helps to reduce holding period risk. To explain, the timeframe in which forward flow sale receivables are accumulated and held by a seller prior to delivery to a buyer is materially reduced in comparison to a bulk sale process holding period. For this reason lost collection opportunities are minimized, resulting in potentially higher competitive prices paid by buyers.

With respect to operational planning and management, again in contrast to the bulk sale process, the ability for forward flow buyers to plan purchases many months or years ahead enhances buyers' abilities to cost effectively manage their internal operations. Improved cost management ultimately results in the ability to pay higher purchase prices to sellers.

With respect to capital acquisition problems as previously described, such problems persist and may be compounded in forward flow sale processes. Compared to bulk sale transactions, purchase capital requirements in forward flow sale transactions are typically equivalent or even larger in size. Moreover, despite the spread of forward flow payments over months or years, the full amount of acquisition capital must be arranged for and committed upon the initial purchase date. To add to these challenges, the cost of capital may be higher for a forward flow transaction as compared to a bulk sale transaction because of the interest carrying costs associated with the longer time period. Consequently, under forward flow processes, many bidders are unable to participate because capital requirements are beyond their reach, and/or because time to borrow capital is inadequate, and/or because they must pay more in carrying costs for capital than can be cost-justified.

As with bulk sales, there are also problems in known forward flow sale processes relating to event risk. For the same reasons associated with bulk sales event risk, as described above, forward flow buyers miss some advantageous portfolio acquisition opportunities and participate in others that are more expensive or have less collection potential. Sellers also may receive a lower purchase price than would otherwise be the case because they market their portfolios at the same time as other sellers.

For the illustrative reasons discussed above, problems associated with the known sale processes tend to exclude broad buyer participation and/or increase their costs of capital. There are also problems associated with holding periods and event risk to the seller. The eventual outcome is for buyers to pay lower competitive prices to sellers, for sellers to in turn be less inclined to offer portfolios of receivables for sale, and for sellers to sustain lost revenues. Given that prices paid to sellers serve to absorb a portion of the sellers' cost of bad debt, low sale prices tend to force credit grantors to either impose more restrictive credit guidelines, or to raise interest rates on credit, or to raise prices. The method of the present invention addresses the above identified problems, as well as others, associated with known processes for selling receivables.

In accordance with the method of the invention, the invention is a process for the optional purchase of receivables. As described above, known processes currently practiced have inherent problems which tend to limit or reduce the potential total volume of market transactions. These known processes also result in inefficiencies for market participants. In contrast to the known processes, the method of the invention provides a process for the market introduction and potential execution of receivables sales or other similar transactions that addresses and/or mitigates a number of the problems described above.

The method of the invention, which is herein characterized as an Optional Purchase Commitment ("OPC"), is a process by which a potential buyer or potential buyers may pay for the right, but not the obligation, to purchase future portfolios of delinquent or charged-off consumer or commercial receivables from a seller or sellers in accordance with an embodiment of the invention. The OPC process of the invention enables a seller of such receivables, typically a credit grantor, to estimate the amount of its future delinquent receivables and enter into OPC agreements to sell those expected receivables for a fixed price ("exercise price") at a specific time in the future to another entity, for example, a buyer. A seller, a buyer, or a broker or other type of third party exchange or clearinghouse may initiate the OPC process of the invention.

In further explanation of the invention, the process of the invention may effect the transfer of receivables from a first entity grantor to a second entity grantee, that is for example, from a seller to a buyer. This transfer or conveyance from the first entity to the second entity may be effected in any suitable manner. Further, it is anticipated that either the first entity or the second entity, or both, may be represented by a broker or other representative entity. These representative entities may act on behalf of the first entity or the second entity. Accordingly, it should be appreciated that the first grantor and the respective representative of the first grantor may be collectively characterized as the grantor. Further, it should be appreciated that the first grantee and the respective representative of the first grantee may be collectively characterized as the grantee.

Further, as described below, the process of the invention may be implemented in the form of a third party exchange or clearinghouse. The clearinghouse accepts information from potential grantors and/or potential grantees. The clearinghouse may then match potential grantors with potential grantees based on desired criteria of both parties. It should be appreciated that the clearinghouse may act independently or may act as an agent for the grantor and/or the grantee.

The OPC process may be utilized in conjunction with any existing marketing processes, including but not limited to competitive bids, RFPs, or private placements. The OPC process in accordance with the method of the invention takes effect as follows. Immediately at the time of acceptance of a buyer's offer by the seller (the "commitment date"), the buyer enters into an OPC contract or agreement with the seller. The OPC contract includes the buyer paying a fee to the seller. Such a fee is paid in exchange for the right to purchase the OPC portfolio at a later date, and may be referred to, for example, as a commitment fee, an option fee, an option commitment fee, or any other suitable terminology. Illustratively, the amount of the commitment fee may be expressed as a small percentage of the exercise price. The amount of the commitment fee may also be proportional to the length of time between the commitment date and the date the portfolio is delivered by the seller to the buyer, for example. However, it should be appreciated that the amount of the commitment fee may be determined in any suitable way using any suitable or desirable parameters.

In accordance with the method of the invention, upon payment of the commitment fee, purchase of the receivables becomes optional for the buyer until the earlier of (1) the date on which the buyer delivers notification to the seller of its intention to accept or decline delivery of the portfolio, or (2) the final date ("notification date") stipulated in the OPC contract or agreement by which the buyer may notify the seller of its intention to accept delivery of the subject portfolio of receivables and to pay the exercise price, or decline delivery. Notification dates can be any number of days, months, or years following the commitment date. The time period between the commitment date and the notification date may be referred to as the "option period." Thus, the option period is a time period between the accepting the option fee by the grantor and the notification date, i.e., a time period that exists in the window of time between the acceptance of the option fee and the notification date. That is, the option period may be any portion of time in this window of time, as may be agreed upon by the respective parties.

In accordance with one embodiment of the invention, on or before the earlier of (1) the date on which the buyer delivers notification to seller of its intention to accept or decline delivery of the portfolio, or (2) the notification date, the buyer, at the buyer's option, may or may not choose to provide notification to the Seller of its intent to pay the exercise price and take delivery of the subject portfolio.

As described above, receivables may be in a variety of forms. That is, "receivables" as used herein in accordance with the method of the invention may include, but not be limited to, charged-off consumer receivables, charged-off commercial receivables, delinquent consumer receivables and/or delinquent commercial receivables, for example. Further, it should be appreciated that receivables may be a hybrid of these respective types of receivables, for example. That is, "receivables" in accordance with embodiments of the invention may include unpaid credit with some characteristics of delinquent receivables and some characteristics of charged-off receivables, for example. In addition, it should be appreciated that "receivables" as used herein may take the form of other unpaid credit not specifically described herein.

It should be appreciated that the invention, in accordance with one embodiment, may involve the "sale" of receivables from one entity to another entity. This embodiment of the invention is described in detail herein. However, it should also be appreciated that the invention is not limited to a "sale" of receivables, i.e., where the conveyance of receivables from one entity to another entity is performed utilizing a sale of the receivables. Rather, in accordance with the method of the invention, it should be appreciated that other types of conveyances may be used. For example, the conveyance may also be a lease, assignment or license, for example, of the receivables, in conjunction with the OPC contract of the invention.

In accordance with an aspect of the invention, it should be appreciated that the notification provisions of an OPC contract in accordance with the invention may contain an affirmative notification, i.e., acceptance, provision, or a notification of declination, i.e., non-acceptance, provision, or both. That is, if affirmative notification provisions are incorporated in the OPC agreement, the buyer is required to deliver affirmative notification to the seller. By doing so, the buyer affirms that it intends to purchase the portfolio when delivered by the seller and then becomes obligated to pay the seller the full exercise price for the portfolio at the scheduled time of delivery, as specified in the OPC contract or agreement. Accordingly, if the buyer fails to deliver the affirmative notification as specified above, the buyer loses its right to purchase the portfolio and forfeits the commitment fee previously paid to the seller.

In contrast to the affirmative notification provisions, if the OPC contract incorporates a notification of declination provision, then by delivering a notification of declination to the seller, the buyer confirms with the seller that the buyer does not intend to purchase the portfolio. By doing so, the buyer is released by the seller from all of buyer's obligations to purchase the portfolio and the seller retains the commitment fee. Accordingly, if the buyer fails to deliver the notice of declination as incorporated in the OPC contract on or before the notification date, the buyer becomes obligated to purchase the portfolio.

In another embodiment, the OPC contract or agreement may require notification regardless of whether the buyer wishes to accept or decline. Accordingly, if the buyer fails to deliver notice to the seller, of either acceptance or non-acceptance, the buyer loses its right to purchase the portfolio and forfeits the commitment fee previously paid to the seller. Further, the OPC contract could even be structured conversely, i.e., where lack of any kind of notification automatically obligates the buyer to purchase the portfolio.

If, pursuant to affirmative notification provisions of the OPC agreement, the buyer makes notification of its intent to accept delivery in accordance with the OPC contract or agreement, but fails to pay the exercise price at the time of delivery ("delivery date"), the buyer is subject to payment of a substantial penalty, i.e., a "non-compliance fee", to the seller. Similarly, if pursuant to notification of declination provisions of the OPC agreement, the buyer fails to deliver a notification of declination and fails to pay the exercise price at the time of delivery ("delivery date"), the buyer is subject to payment of a substantial penalty, i.e., a "non-compliance fee", to the seller. The seller is likewise subject to payment of a non-compliance fee to the buyer if the seller fails to deliver the portfolio of receivables upon the delivery date as specified in the OPC contract or agreement.

The OPC process may be utilized in conjunction with any existing marketing processes, including but not limited to competitive bids, RFPs, or private placements. However, it should be appreciated that the OPC process of the invention contrasts with both bulk and forward flow transaction types in several ways. For example, the OPC process of the invention does not require a mandatory commitment on behalf of the buyer during the option period. Instead, the OPC process enables the buyer to pay for the right, but not the obligation, to purchase future portfolios of receivables. In return for this right or option, the seller is paid a non-refundable commitment fee by the buyer. In addition, the OPC process of the invention provides a time horizon or option period. This time horizon or option period is advantageous for both buyer and seller, for reasons to be illustrated in greater detail as described below.

In accordance with one embodiment of the invention, the method of the invention may be implemented using a computer arrangement. For example, the computer arrangement may include a seller computer and a buyer computer. The computer arrangement may also include an interface computer. The interface computer, the seller computer and the buyer computer may be in communication in any suitable manner. Illustratively, the computers may communicate over the Internet, by using dial-up communication systems, or alternatively, the computers may co-exist on a network so as to be in communication with each other. Further, it should be appreciated that only a portion of the method of the invention may be implemented using a computer.

In accordance with a further embodiment of the invention, the interface computer may match potential sellers with potential buyers, and also may effect the OPC process of the invention. That is, the interface computer processes seller information and buyer information to find the most suitable buyer and seller match. This matching process may be performed in any suitable manner. In accordance with this embodiment of the invention, the OPC process of the invention may be automated with little or no human intervention. Accordingly, the computer implemented method of the invention may function as a type of third party clearinghouse or exchange.

Further aspects of the method of the invention will be described below. It should be appreciated that words or terms used herein in the singular may be read to include the plural. Further, words or terms used herein in the plural may be read to include the singular.

BRIEF DESCRIPTION OF THE DRAWINGS

These and other aspects of the invention will become apparent from the following descriptions which illustrate exemplary embodiments of the invention when read in conjunction with the accompanying drawings, in which.

DETAILED DESCRIPTION OF THE PREFERRED EMBODIMENTS

Figure 1:
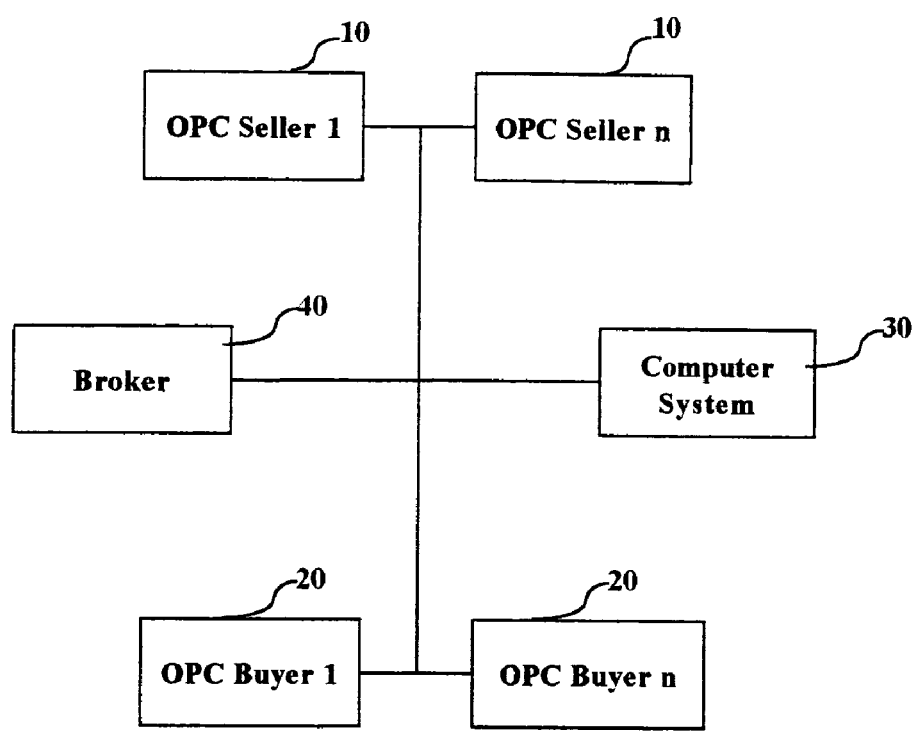
FIG. 1 is a diagram showing the participants of the OPC process in accordance with one embodiment of the system and method of the invention.

In the Drawings, FIG. 1 is a diagram illustrating the participants in the OPC process in accordance with the method of the invention. As shown in FIG. 1, the OPC process includes at least one OPC seller 10. Accordingly, it should be appreciated that the OPC process of the invention may include any number of OPC sellers. Additionally, as shown in FIG. 1, another participant in the OPC process of the invention is at least one OPC buyer 20. In a similar manner to the sellers, there may be any number of OPC buyers.

As shown in FIG. 1, the OPC process of the invention may also include a broker 40. The broker or brokers 40 may participate in the OPC process of the invention in any suitable manner. For example, a broker 40 may be an intermediary between a seller 10 and a buyer 20. Alternatively, a broker 40 may represent either a seller or a buyer, or alternatively, a collection of sellers or a collection of buyers.

Figure 2:
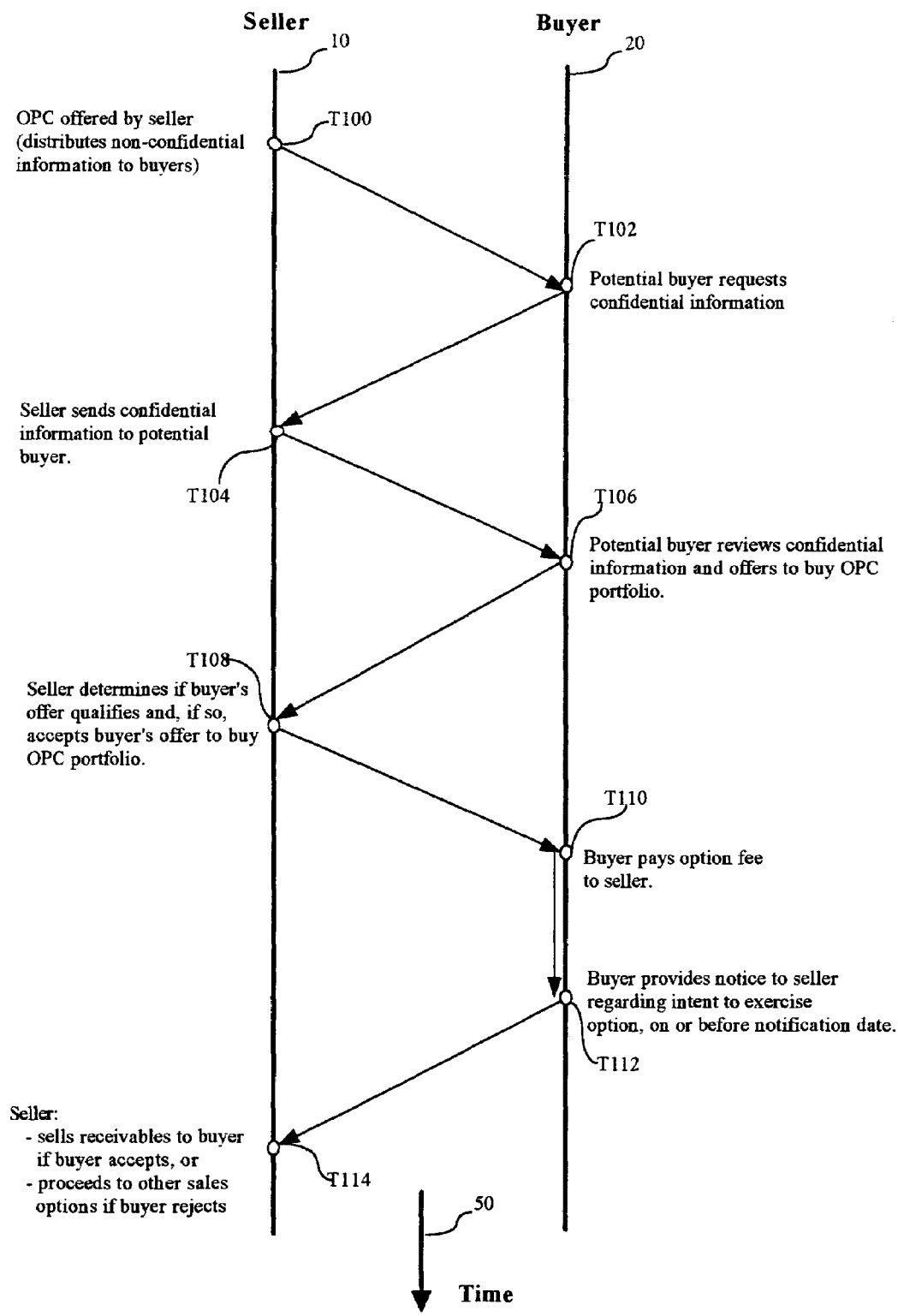
FIG. 2 is a diagram showing the optional purchase process from the perspective of a seller and a buyer as time advances in accordance with an embodiment of the system and method of the invention.

FIG. 2 is a diagram showing further aspects of the OPC process in accordance with the method of the invention. Illustratively, FIG. 2 shows the actions of a seller 10 and a buyer 20 in the OPC process. As shown in FIG. 2, a left side vertical line represents the seller 10. Additionally, the right side vertical line represents a buyer 20. An arrow 50 represents the advancement of time.

As shown in FIG. 2, the seller is depicted as initiating the OPC process at time T100. However, as is described in further detail below, it should be appreciated that the buyer may also initiate the OPC process.

As shown in FIG. 2, the process of the invention is initiated by the seller 10 offering an OPC offer to a buyer or a number of buyers at time T100. This offering may be effected in the manner of distribution of non-confidential information to potential buyers. Non-confidential information may be distributed by the seller to potential buyers verbally or in written or electronic format. The purpose of the non-confidential information is to inform potential buyers about the existence and general nature of the OPC sale offering and the sale process and may include, but not be limited to, the following types of information: (a) the seller's name or, alternatively, a brief description of the seller without disclosing the seller's name; (b) a general or detailed description of the receivables proposed for sale; (c) the broker's name (if applicable); (d) the amount of the receivables offered for sale; (e) a general or detailed description of the OPC sales process including benchmark dates; (f) receivables type groupings which may include credit cards, utility accounts, auto loan deficiencies, or wireless telecommunications accounts, for example; (g) size groupings such as maximum, minimum, and average balances and balance ranges including groupings by number of charged-off receivables and their respective grouping balance totals; (h) demographic information groupings indicating geographic locations of last known debtor addresses including groupings by number of receivables and their respective grouping balance totals; (i) receivables aging information groupings describing maximum, minimum, and average time frames from the initial occurrence of delinquency or charge-off to present, including groupings by number of receivables and their respective grouping balance totals.

Upon receiving the non-confidential information, potential buyers review the non-confidential information. If potential buyers are interested in the OPC portfolio, then potential buyers so advise the seller, or broker or other third party exchange or clearinghouse if applicable, either verbally, electronically or in writing. Specifically, a potential buyer requests additional information regarding the OPC portfolio of receivables offered by the seller at time T102. This may well include, illustratively, confidential information regarding the OPC portfolio. As a condition preceding the seller's release of confidential information to the potential buyer, the seller may request that the potential buyer provide written or verbal assurances that the buyer will protect and not disclose the confidential information. These assurances may be provided in any suitable manner.

In further explanation at time T102, as shown in FIG. 2, the potential buyer requests confidential information from the seller, as described above. Subsequent to the buyer's request, the seller sends the confidential information to the potential buyer. In this disclosure of confidential information to the potential buyer, the seller may utilize a confidentiality agreement. To explain further, while general non-confidential information describing an OPC offering may be disclosed prior to the execution of the confidentiality agreement, detailed confidential information fully describing the OPC process is only disclosed, in accordance with an embodiment of the invention, after all participants have executed a confidentiality agreement. Illustratively, the confidentiality agreements are written agreements between sellers and buyers that specific information, which is conveyed between the parties, is privileged communication that may not be disclosed to third parties. Additionally, the confidentiality agreement may limit the use of the information by the respective parties. At this point in time, the seller will likely confirm, or may have earlier confirmed, that the buyer is indeed a suitable buyer in terms of credibility and available assets, for example.

The seller then sends confidential information to the potential buyer at time T104. The purpose of the confidential information is to inform potential buyers as to the specific nature of the OPC offering. Illustratively, in addition to the non-confidential information already disclosed, confidential information may include, but is not limited to, the following types of written or electronic information: (a) a detailed description of the receivables proposed for sale; (b) a detailed description of the proposed OPC sales contract or a specimen OPC agreement; (c) a sample data file which represents the type and quality of receivables information proposed for delivery by the seller to the successful buyer; (d) instructions that inform potential buyers as to the method for making an offer to purchase to the seller; (e) a description of the seller collection efforts that may include narratives and/or statistical descriptions of seller's work efforts to collect receivables including seller's use of third party collectors, seller's own internal collection practices, seller's policy and procedural criteria for reclassification of accounts to charged-off status, or the like, for example; (f) the seller's past sales history, such as a description of the seller's prior sale transactions; (g) a description of post sale credit bureau reporting, which may include identification of credit bureaus used by the seller prior to a sale, and a description of post sale ratings provided by the seller to credit bureaus for the purpose of changing public information regarding any change of ownership of receivables; (h) data file descriptions, which may be used in conjunction with data files, such descriptions defining individual data fields that may be delivered to a buyer by the seller on the delivery date.

It should be appreciated that a receivable distributed in accordance with the OPC process of the invention may be in a variety of forms or physical files composed of account documentation and/or electronic data. To explain, a receivable may, for example, be in the form of a data file. Each charged-off receivable, i.e., which may be characterized as a "data record", is composed of many individual data elements called "data fields" such as data name, data address, city, state, zip code, as well as other information, for example. Receivables portfolios are collections of multiple data records called "data files." Because the OPC process involves a seller granting a buyer the right or option to purchase receivables portfolios at a future date, it is possible that specific individual debtor data records do not exist at the time the participants enter into an OPC agreement. To mitigate this uncertainty, an OPC contract of the invention may provide that a portfolio of receivables will, in aggregate and at the time of delivery to the buyer, meet certain pre-defined characteristics. Such characteristics may include geographic distribution, average account balance, date of delinquency, and date of charge-off, for example, as well as other particulars described earlier.

In accordance with a further aspect of the method of the invention, the OPC contract may include "tolerance restrictions" or parameters. To explain, tolerance restrictions may be included in the OPC contract and can enable a seller to represent and warrant to the buyer such particulars as receivables, grades, inclusion and exclusion parameters of receivables, or limit governing the minimum and maximum quantities of receivables that can be delivered for purchase, for example. Illustratively, these tolerance limitations can specify, for example, the minimum and maximum total amount of receivables that can be delivered to a buyer; the total amount of receivables with last known addresses in specific states; the total amount of receivables that have been subjected to a specific number of contingent collection agencies; and/or the maximum individual receivable balance allowed for delivery. Tolerance restrictions or parameters, in part, can provide the participants with a basis for determining a purchase price for the receivables portfolio to be delivered on the OPC delivery date.

As shown in FIG. 2, the buyer then reviews the confidential information and decides whether or not to offer to buy the OPC portfolio at time T106. If the buyer decides not to offer to purchase the OPC portfolio, then the process in terms of that particular buyer will terminate. However, the seller can then elect to pursue other potential buyers or terminate the OPC sale process.

FIG. 2 depicts the situation wherein the buyer does indeed offer to purchase the OPC portfolio at time T106. Accordingly, at time T108, the seller determines if the buyer's offer qualifies. This may include the seller checking that the buyer's offer price is acceptable to the seller and that other negotiable points are acceptable to the seller. It should be appreciated that this may involve a negotiation or a series of negotiations between the buyer and the seller. If the seller is satisfied with the buyer's offer, then the seller accepts the buyer's offer to buy the OPC portfolio at time T108.

Upon the buyer's acceptance at time T108, the OPC process of the invention moves to time T110. At time T110, the buyer pays a commitment fee to the seller. The option commitment fee may or may not be refundable to the buyer as herein further illustrated. Following the passage of time from T110 to T112, herein referred to as the "option period", the buyer then provides notice to the seller regarding the buyer's intent to exercise the option at time T112. Specifically, the buyer provides notice to the seller on or before the notification date, as specified in the OPC contract or agreement.

After time T112, the process of the invention then moves to time T114. At time T114, the seller receives the buyer's decision whether to buy or not to buy the receivables in accordance with the OPC contract or agreement. Specifically, if the buyer accepts, i.e., decides to purchase the portfolio of receivables, then the seller sells the receivables to the buyer. Alternatively, if the buyer rejects the OPC portfolio, i.e., decides not to purchase the receivables, then the seller is free to terminate the OPC sales process or pursue other potential buyers in order to sell the receivables. It should be appreciated that at time T114, the seller will generally keep the commitment fee.

As described above, FIGS. 1 and 2 depict a seller and a buyer. It should be appreciated that as used herein, a seller is a particular type of grantor. Additionally, a buyer is a particular type of grantee in accordance with the invention. Accordingly, a seller may be characterized as a person, company or other entity that sells delinquent or charged-off receivables pursuant to the OPC process of the invention. Further, a buyer may be characterized as a person, company, or other entity that purchases the delinquent or charged-off receivables pursuant to the OPC process of the invention. Further, as described herein, either the seller or the buyer may be characterized as the initiating party or the "initiator." Essentially, the initiator is the person, company or other entity initiating the OPC process.

As described herein, a broker may be utilized in the process of the invention. The broker is the person, company or entity that acts as the marketing representative on behalf of the seller or alternatively, the buyer. It should further be appreciated that a third party exchange or clearinghouse, which may be electronic or otherwise, may also utilize the OPC process of the invention, acting on behalf of the grantor, or the grantee, or both, or neither, i.e., if neither then acting independently.

As described herein, the OPC process of the invention relates to the distribution, and more specifically sale, of a receivable. A receivable may be any type of delinquent or charged-off consumer or commercial receivable, for example. A delinquent receivable may be characterized as any type of extension of credit that all or in part remains on the books of the credit grantor or current owner of the receivable, but for which the debtor has failed to satisfy its repayment obligations under a payment agreement with the credit grantor or owner of the receivable. Further, a charged-off receivable, which may also be referred to as a profit/loss write off receivable, is a receivable that the credit grantor has deemed uncollectible. For internal accounting/tax purposes, charged-off accounts are written off as bad debt on the credit grantor's balance sheets and financial statements.

FIGS. 3-11 are flowcharts that illustrate further aspects of the method of the invention. It should be appreciated that the processes as described below in conjunction with FIGS. 3-11 are illustrative, but not limiting, of the method of the present invention.

It should be appreciated that the flow chart illustration provided herein depicts an instance where affirmative notification, i.e., notice of acceptance, is required, and where no notice is construed by the seller as the buyer's abandonment of the option. Conversely, the OPC process of the invention may incorporate a requirement for notification of declination, i.e., notice of non-acceptance, wherein no notice is construed as an acceptance. Further, in another embodiment, the OPC process may provide for notification to be required in all cases, regardless of whether a buyer wishes to accept or decline.

Figure 3:
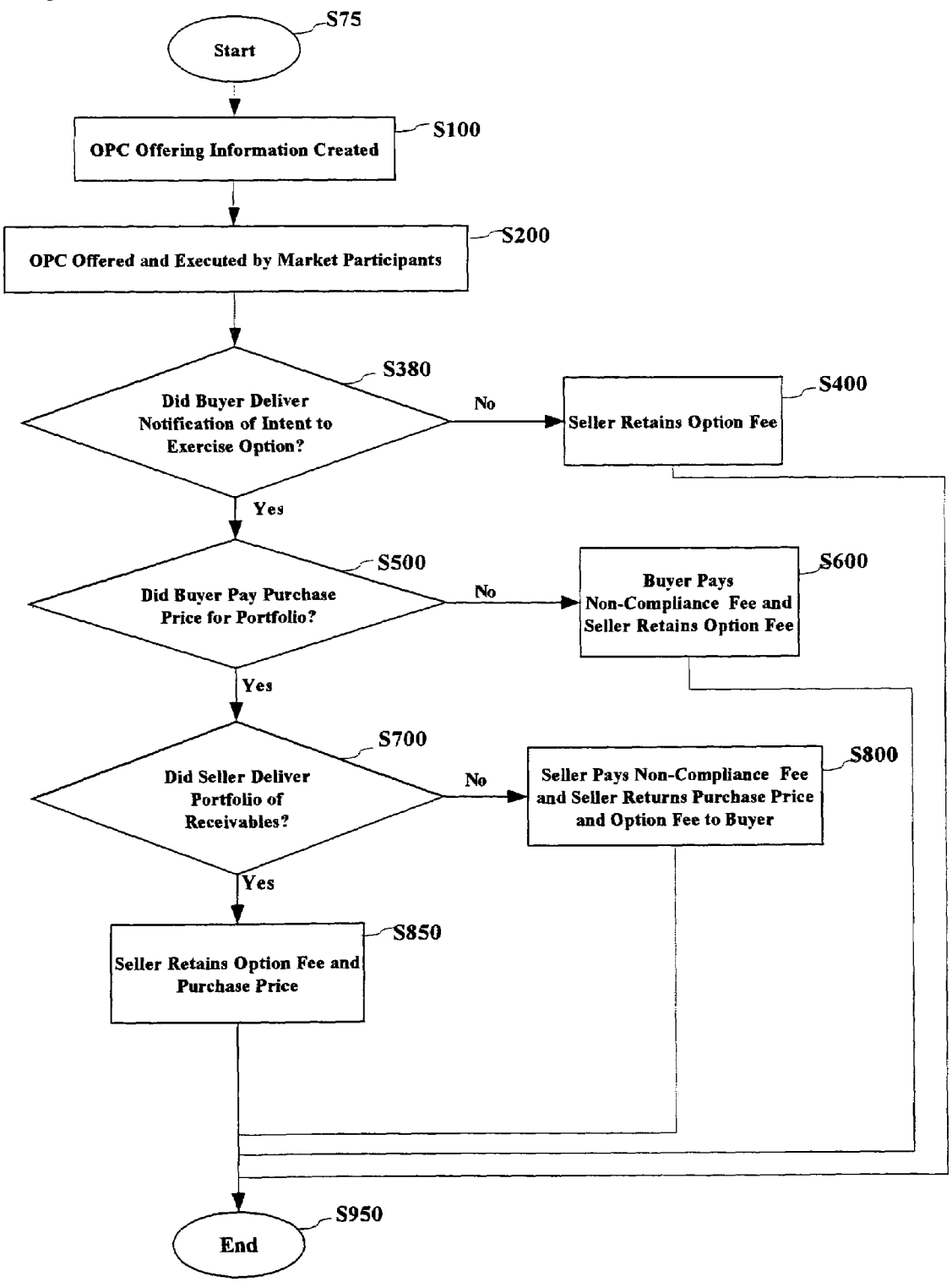
FIG. 3 is a flowchart showing the OPC process of the invention in accordance with an embodiment of the system and method of the invention.

As shown in FIG. 3, the process starts in step S75. Then, the process passes to step S100. In step S100, the OPC offering information is created. Then, the process passes to step S200. In step S200, the OPC is offered and executed by market participants. Then, the process passes to step S380.

In step S380, a determination is made by the process whether the buyer delivered notification of intent to exercise the option. If no, then the seller retains the option commitment fee in step S400. After step S400, the process passes to step S950. In step S950, the process ends.

Alternatively, if the buyer did deliver notification of intent to exercise the option in step S380, then the process passes to step S500. In step S500, the process determines whether the buyer paid a purchase price for the portfolio. If no, then the process passes to step S600. In step S600, the buyer pays a non-compliance fee and the seller retains the option commitment fee. After step S600, the process passes to step S950. In step S950, the process ends.

Alternatively, if in step S500, the buyer did pay the purchase price for the portfolio, then the process passes to step S700. In step S700, the process determines whether the seller delivered the portfolio of receivables. If no, then the process passes to step S800. In step S800, the seller pays a non-compliance fee and the seller returns the purchase price and the option commitment fee to the buyer. Then, the process passes to step S950, in which the process ends.

If in step S700, the seller did deliver the portfolio of receivables, then the process passes to step S850. In step S850, the seller retains the option commitment fee. Then the process passes to step S950. In step S950, the process ends.

Figure 4:
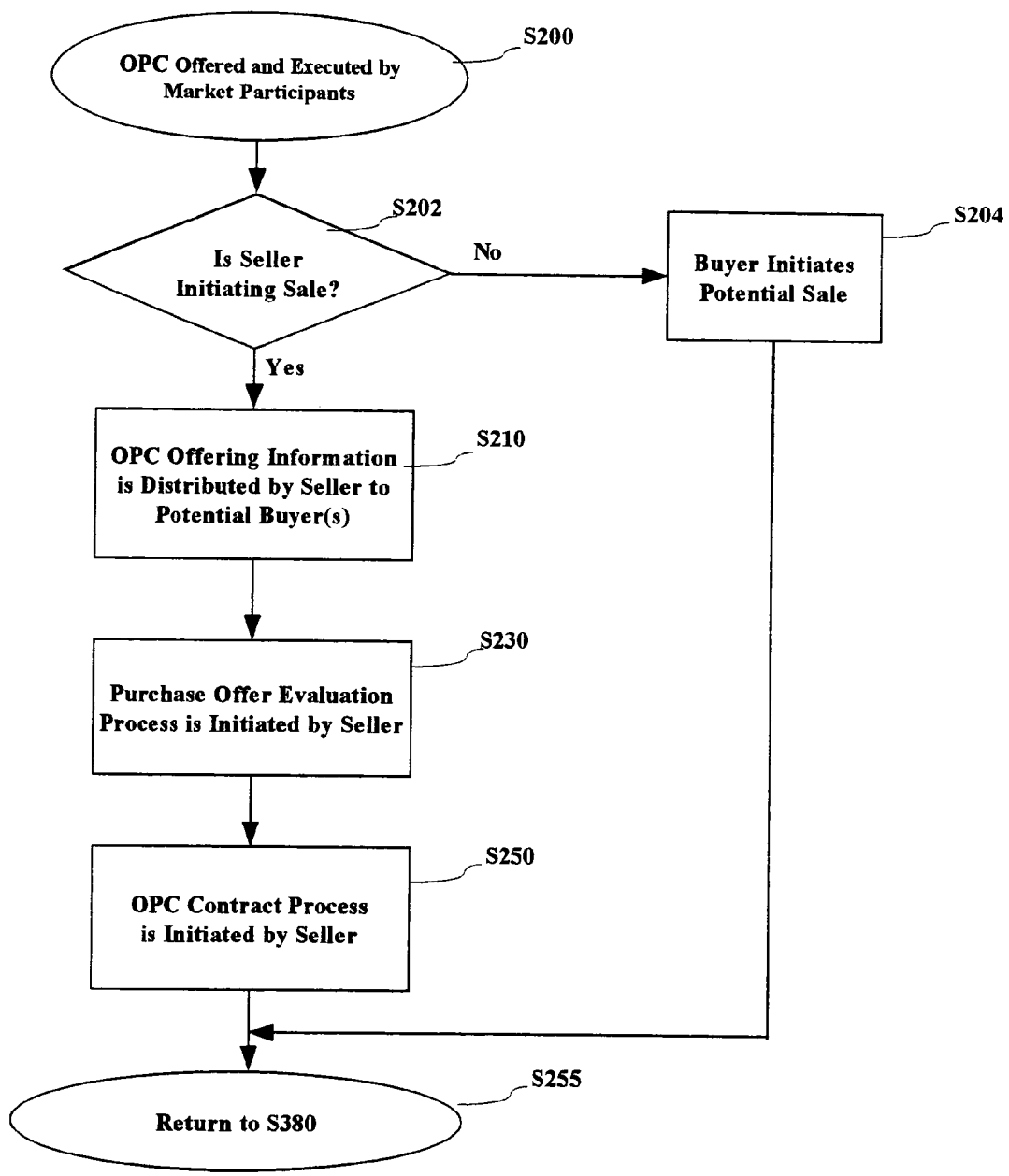
FIG. 4 is a flowchart showing the "OPC offered and executed by market participants" step of FIG. 3 in further detail in accordance with an embodiment of the system and method of the invention.

FIG. 4 illustrates in further detail the "OPC offered and executed by market participants" step S200 of FIG. 3. As shown in FIG. 4, the process starts in step S200. Then, the process passes to step S202.

In step S202, the process determines whether the seller is initiating the sale. If yes, then the process passes to step S210. In step S210, the seller distributes OPC offering information to potential buyers. Then, in step S230, the purchase offer evaluation process is initiated by the seller. Then, the process passes to step S250.

In step S250, the OPC contract process is initiated by the seller. After step S250, the process passes to step S255. In step S255, the process returns to step S380 in FIG. 3.

Alternatively, as shown in step S202 in FIG. 4, the seller may not be initiating the sale. Accordingly, if no in step S202, then the process passes to step S204. In step S204, the buyer initiates the potential sale. After step S204, the process passes to step S255. In step S255, the process returns to step S380 in FIG. 3.

Figure 5:
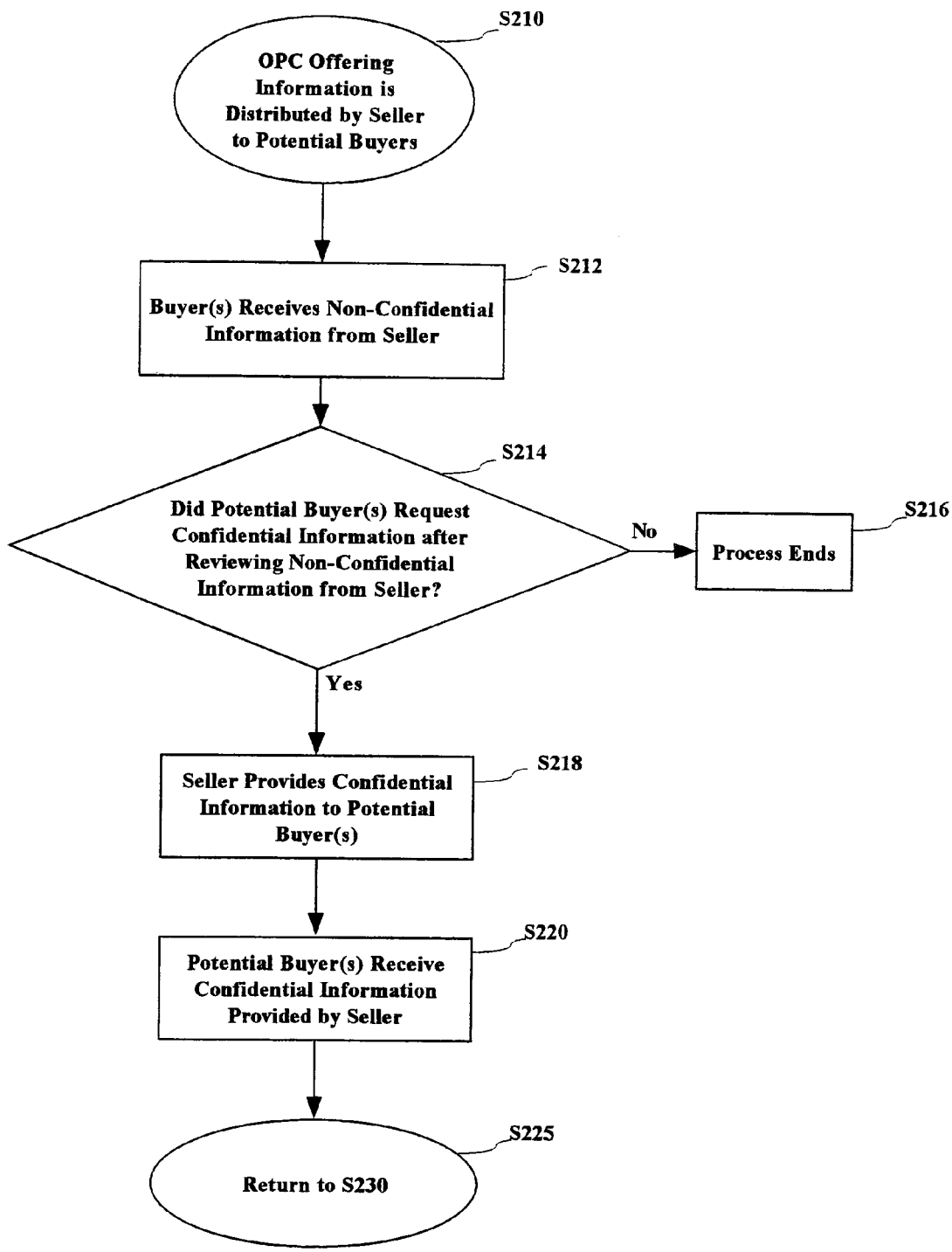
FIG. 5 is a flowchart showing the "offering information is distributed by seller to potential buyers" step of FIG. 4 in further detail in accordance with an embodiment of the system and method of the invention.

FIG. 5 illustrates in further detail the "OPC offering information is distributed by seller to potential buyers" step S210 of FIG. 4. As shown in FIG. 5, the process starts in step S210. Then the process passes to step S212. In step S212, a buyer or buyers receive non-confidential information from a seller. Then, the process passes to step S214.

In step S214, a determination is made whether the potential buyer or buyers requested confidential information after reviewing non-confidential information from the seller. If no, then the process ends in step S216.

Alternatively, if in step S214, the potential buyers did request confidential information after reviewing non-confidential information from the seller, then the process passes to step S218. In step S218 as shown in FIG. 5, the seller provides confidential information to the potential buyers. Then, the process passes to step S220.

In step S220, the potential buyer or buyers receive confidential information from the seller. After step S220, the process passes to step S225. In step S225, the process returns to step S230 in FIG. 4.

Figure 6:
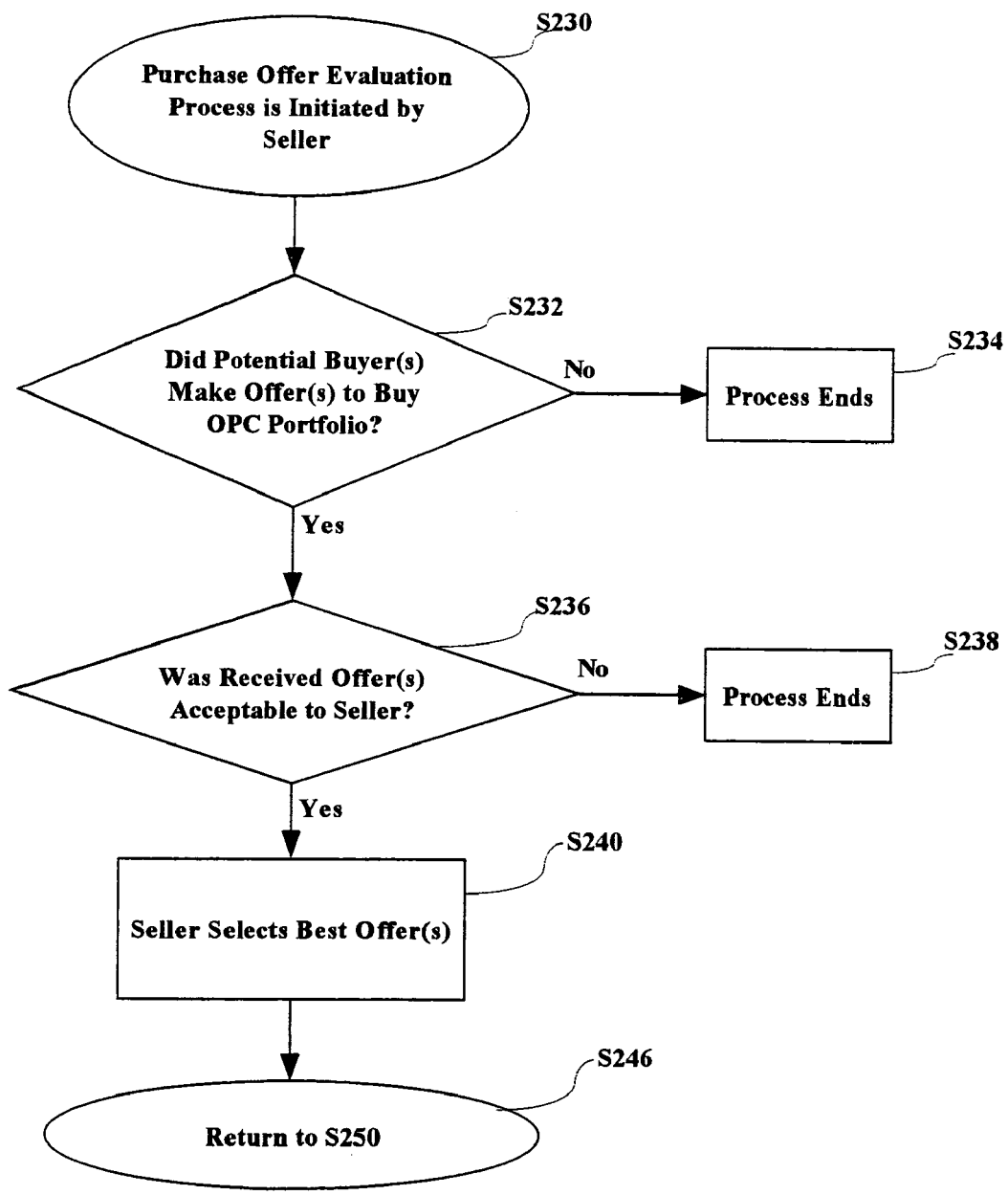
FIG. 6 is a flowchart showing the "purchase offer evaluation process is initiated by seller" step of FIG. 4 in further detail in accordance with an embodiment of the system and method of the invention.

FIG. 6 illustrates in further detail the "purchase offer evaluation process is initiated by seller" step S230 of FIG. 4. As shown in FIG. 6, the process starts in step S230. Then, the process passes to step S232.

In step S232, the process determines whether the potential buyers or buyer offered to buy the OPC portfolio of receivables. If no, then the process passes to step S234. In step S234, the process ends.

Alternatively, if in step S232, the potential buyers did make an offer to buy the OPC, then the process passes to step S236. In step S236, the process determines whether the offer received by the seller was acceptable to the seller. If no in step S236, then the process passes to step S238. In step S238, the process ends.

Alternatively, if yes in step S236, i.e., an acceptable offer was received by the seller, then the process passes to step S240. In step S240, the seller selects the best offer or offers.

After step S240, the process passes to step S246. In step S246, the process returns to step S250 in FIG. 4.

Figure 7:
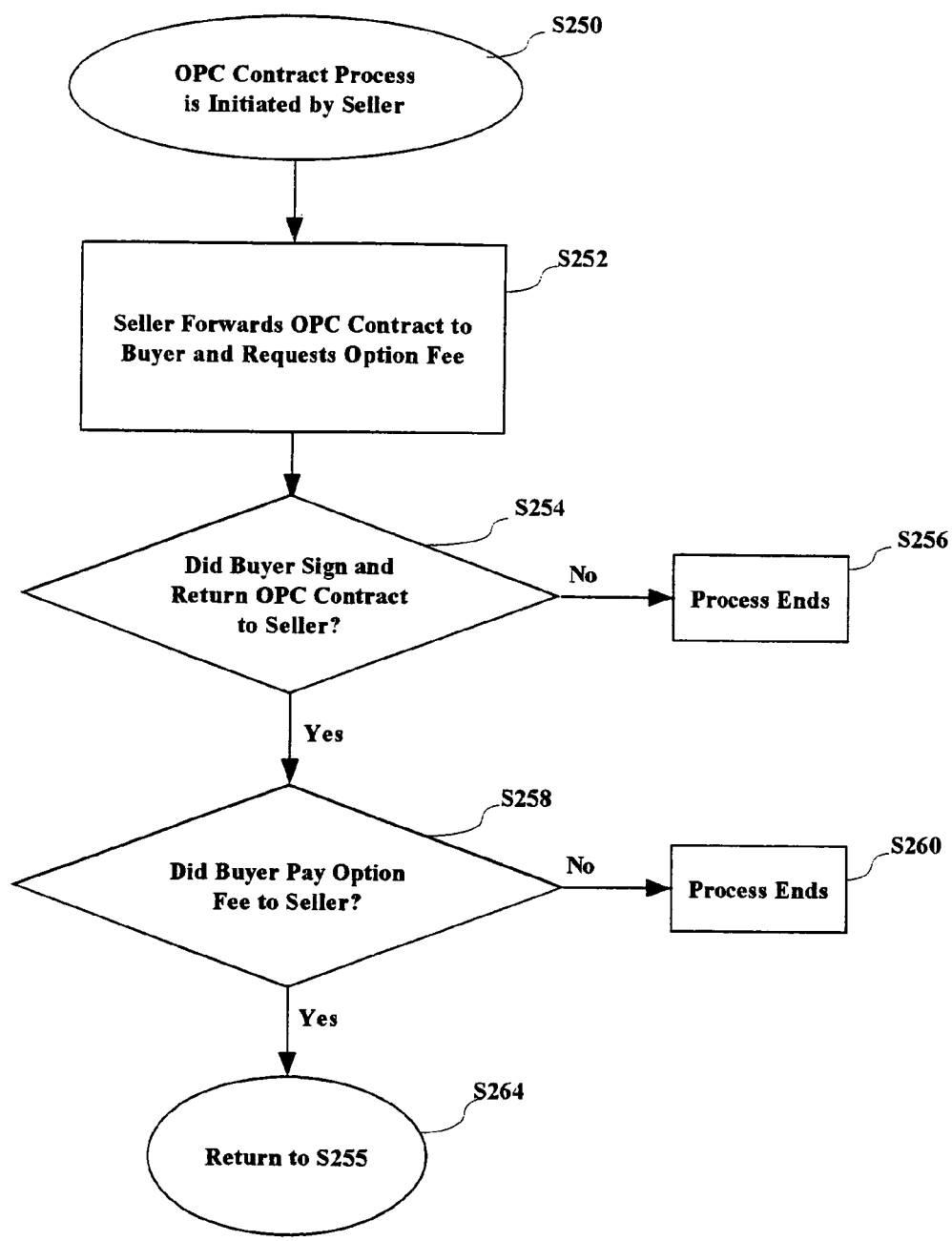
FIG. 7 is a flowchart showing the "OPC contract process is initiated by seller" step of FIG. 4 in further detail in accordance with an embodiment of the system and method of the invention.

FIG. 7 illustrates in further detail the "OPC contract process is initiated by seller" step S250 of FIG. 4. As shown in FIG. 7, the process starts in step S250. Then, the process passes to step S252. In step S252, the seller forwards the OPC contract to the buyer and requests an option fee, i.e., a commitment fee. Then, the process passes to step S254.

In step S254, the process determines whether the buyer completed and returned the OPC contract to the seller. If no, then the process passes to step S256. In step S256, the process ends.

Alternatively, if in step S254, the buyer did complete and return the OPC contract to the seller, then the process passes to step S258. In step S258, the process determines whether the buyer paid a commitment fee, i.e., an option fee, to the seller. If no, then the process passes to step S260. In step S260, the process ends.

Alternatively, if yes in step S258, i.e., the buyer did pay the commitment fee to the seller, then the process passes to step S264. In step S264, the process returns to step S255 in FIG. 4.

As described above, it should be appreciated that each of FIGS. 5-7 pertain to the situation wherein the seller is initiating the sale of the receivables. However, as illustrated in step S204 of FIG. 4, the buyer may also initiate a potential sale. This situation is illustrated in further detail with reference to FIGS. 8-11. Specifically, FIG. 8 illustrates the "buyer initiates potential sale" step S204 of FIG. 4.

Figure 8:
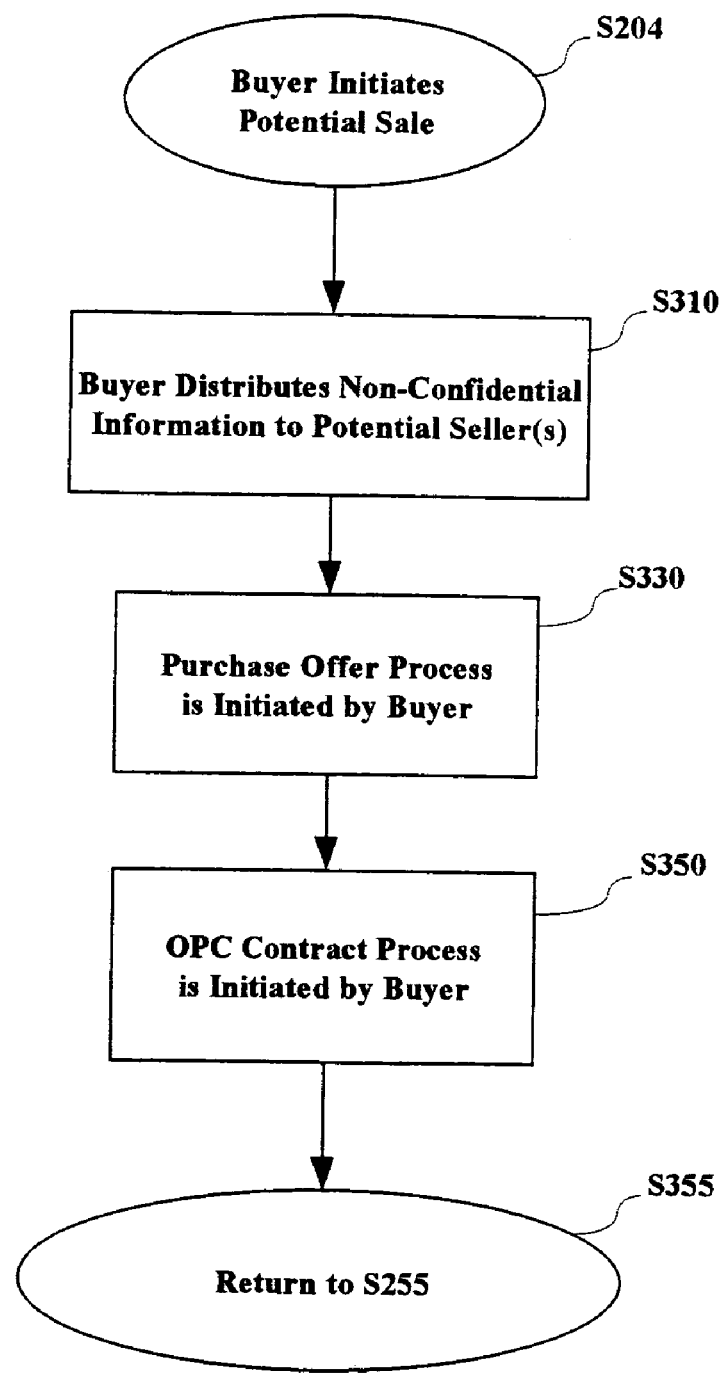
FIG. 8 is a flowchart showing the "buyer initiates potential sale" step of FIG. 4 in further detail in accordance with an embodiment of the system and method of the invention.

As shown in FIG. 8, the process starts in step S204. Then, the process passes to step S310. In step S310, the buyer distributes non-confidential information to potential sellers. Non-confidential information may be distributed by the buyer to potential sellers verbally or in written or electronic format. The purpose of the non-confidential information is to inform potential sellers about the existence and general nature of the buyer's OPC purchase offer and the purchase process and may include, but not be limited to, the following types of information: (a) the buyer's name or, alternatively, a brief description of the buyer without disclosing the buyer's name; (b) a general or detailed description of the receivables proposed for sale; (c) the broker's name (if applicable); (d) the amount of the receivables the buyer is offering to purchase; (e) a general or detailed description of the OPC purchase process including benchmark dates; (f) receivables type groupings which may include credit cards, utility accounts, auto loan deficiencies, or wireless telecommunications accounts, for example; (g) size groupings such as maximum, minimum, and average balances and balance ranges including groupings by number of charged-off receivables and their respective grouping balance totals; (h) demographic information groupings indicating geographic locations of last known debtor addresses including groupings by number of receivables and their respective grouping balance totals; (i) receivables aging information groupings describing maximum, minimum, and average time frames from the initial occurrence of delinquency or charge-off to present, including groupings by number of receivables and their respective grouping balance totals.

After step S310 as shown in FIG. 8, the process passes to step S330. In step S330, a purchase offer process is initiated by the buyer. Then the process passes to step S350.

In step S350, the OPC contract process is initiated by the buyer. Then, the process passes to step S355 as shown in FIG. 8. In step S355, the process returns to step S255 in FIG. 4.

Figure 9:
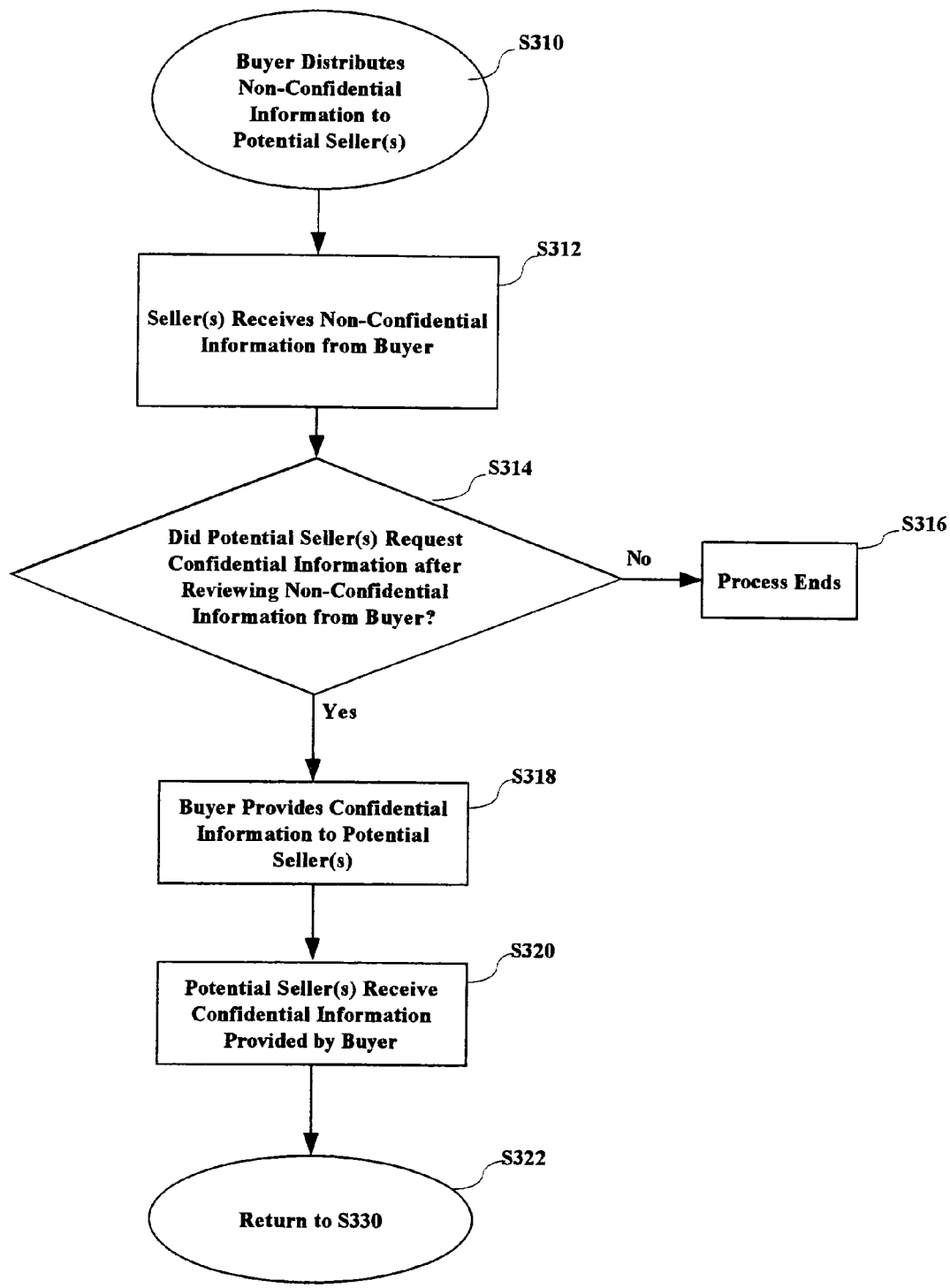
FIG. 9 is a flowchart showing the "buyer distributes non-confidential information to potential sellers" step of FIG. 8 in further detail in accordance with an embodiment of the system and method of the invention.

FIG. 9 illustrates in further detail the "buyer distributes non-confidential information to potential sellers" step S310 of FIG. 8. As shown in FIG. 9, the process starts in step S310. Then, the process passes to step S312.

In step S312, the seller receives non-confidential information from the buyer. Then, the process passes to step S314.

In step S314, the process determines whether the potential seller requested confidential information after reviewing the non-confidential information from the buyer. If no in step S314, then the process passes to step S316. In step S316, the process ends.

Alternatively, if yes in step S314, i.e., the potential seller did request confidential information after reviewing the non-confidential information from the buyer, then the process passes to step S318.

In step S318, the buyer sends the confidential information to the potential seller or sellers. Then, the process passes to step S320.

In step S320, the potential sellers receive confidential information provided by the buyer. Then, the process passes to step S322. In step S322, the process returns to step S330, as shown in FIG. 8.

It should be appreciated that the purpose of the confidential information is to inform potential sellers as to the specific nature of the OPC offering desired by the buyer, and may be similar in form and content to the confidential information previously described above. Illustratively, in addition to the non-confidential information already disclosed, confidential information provided by the buyer may include, but is not limited to, the following types of written or electronic information: (a) a detailed description of the receivables desired for purchase; (b) a detailed description of the proposed OPC contract or a specimen OPC agreement; (c) a sample electronic data file which depicts the type and quality of information desired for delivery to the buyer by the successful seller; (d) instructions that inform potential sellers as to the method for making an offer to sell to the buyer; (e) a description of buyer restrictions that may limit the extent of the potential seller's prior collection efforts; (f) the buyer's requirements governing post-sale credit bureau reporting; or (g) tolerance restrictions, as previously described. Additionally, because the OPC process of the invention involves a seller granting a buyer the right or option to purchase receivables at a future date, it is possible that specific individual debtor data records do not exist at the time the seller and buyer enter into an OPC agreement. Thus, in a manner similar to the seller initiated OPC process, pre-defined characteristics may or may not be required by the participants at any time during the buyer initiated OPC process.

Figure 10:
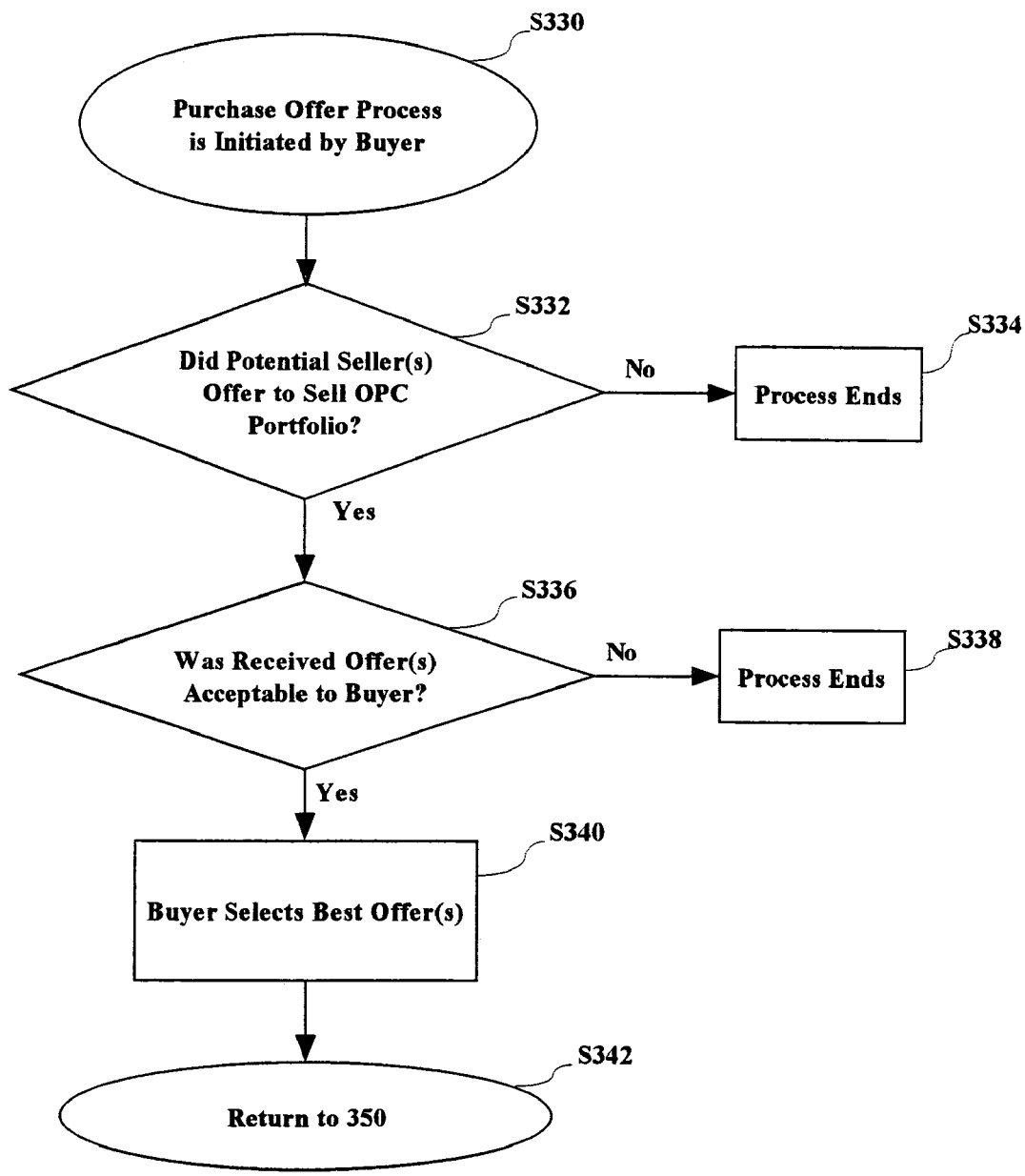
FIG. 10 is a flowchart showing the "purchase offer process is initiated by buyer" step of FIG. 8 in further detail in accordance with an embodiment of the system and method of the invention.

FIG. 10 shows in further detail the "purchase offer process is initiated by buyer" step S330 of FIG. 8. As shown in FIG. 10, the process starts in step S330. Then, the process passes to step S332.

In step S332, the process determines whether the potential seller made an offer to sell an OPC portfolio of receivables. If no, then the process passes to step S334. In step S334, the process ends.

Alternatively, if yes in step S332, i.e., the potential seller did make an offer to sell an OPC portfolio of receivables, then the process passes to step S336.

In step S336, the process determines whether the offer received by the buyer was acceptable to the buyer. If no, then the process passes to step S338. In step S338, the process ends.

Alternatively, if yes in step S336, i.e., an offer was received by the buyer from the seller that was acceptable to the buyer, then the process passes to step S340. In step S340, the buyer selects the best offer or offers.

After step S340, the process passes to step S342. In step S342, the process returns to step S350, as shown in FIG. 8.

Figure 11:
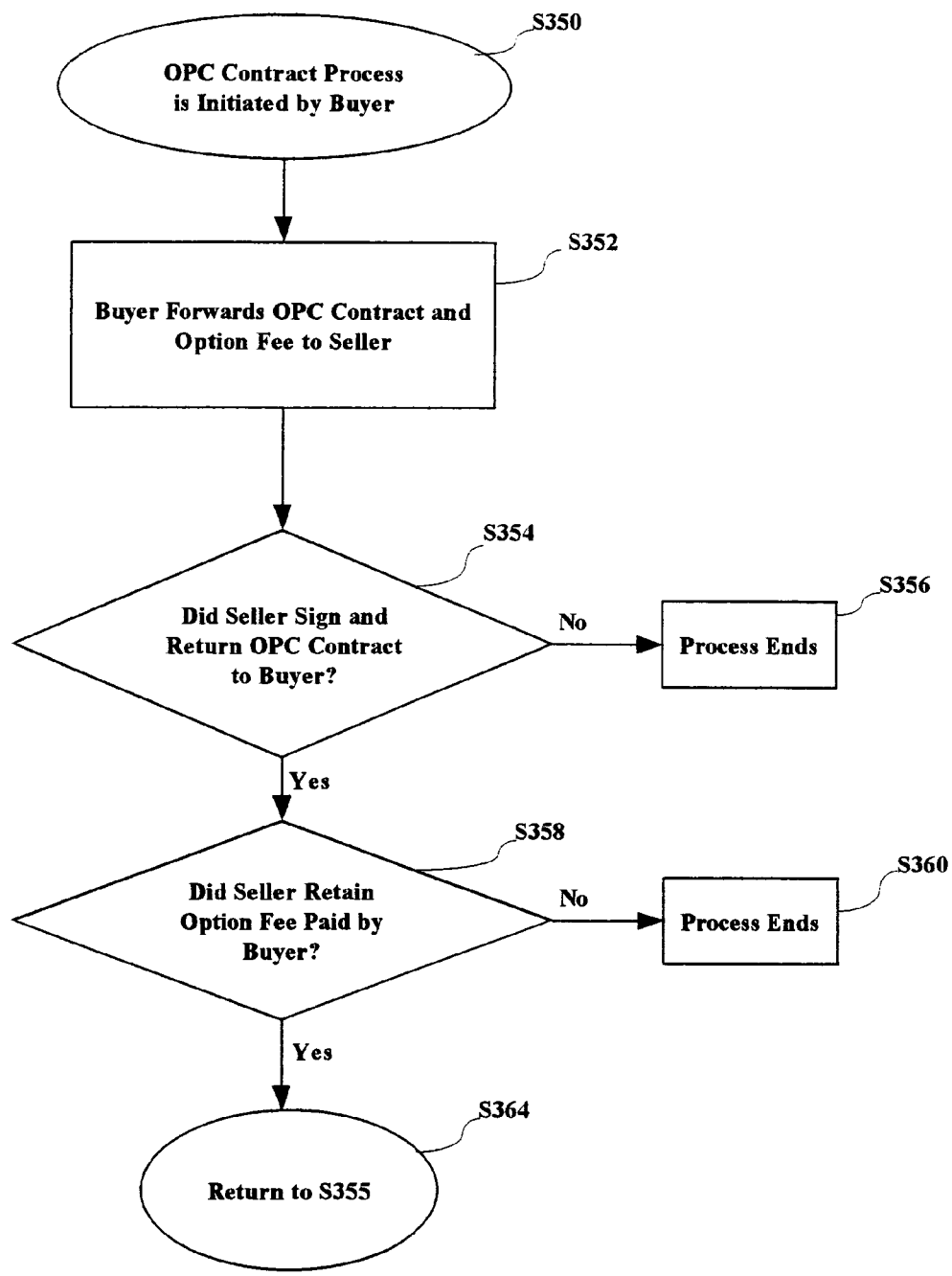
FIG. 11 is a flowchart showing the "OPC contract process is initiated by buyer" step of FIG. 8 in further detail in accordance with an embodiment of the system and method of the invention.

FIG. 11 illustrates in further detail the "OPC contract process is initiated by buyer" step S350 of FIG. 8. As shown in FIG. 11, the process starts in step S350. Then, the process passes to step S352. In step S352, the buyer forwards the OPC contract and commitment fee, i.e., option fee, to the seller. Then, the process passes to step S354.

In step S354, the process determines whether the seller completed and returned the OPC contract to the buyer. If no, then the process passes to step S356. In step S356, the process ends.

Alternatively, if yes in step S354, i.e., the seller did complete and return the OPC contract to the buyer, then the process passes to step S358.

In step S358, the process determines whether the seller retained the option fee paid by the buyer. If no in step S358, then the process passes to step S360. In step S360, the process ends.

Alternatively, if yes in step S358, i.e., the seller did retain the option fee paid by the buyer, then the process passes to step S364. In step S364, the process as shown in FIG. 11 returns to step S355 in FIG. 8.

In accordance with a further aspect of the method of the invention, it should be recognized that both the seller and the buyer may face penalties for non-performance of the OPC agreement. That is, for example, should either party fail to perform their obligations following the date the buyer notifies the seller of its intention to take delivery of the portfolio, the failing party would be required to pay a non-compliance fee as provided by the OPC contract or agreement. It should further be noted that under conventional processes, no specific remedy is provided. That is, parties to conventional process transactions can either do nothing or sue for non-performance.

As described in conjunction with illustrative FIGS. 3-11, the method of the invention may relate to the sale of receivables. However, it should be appreciated that the invention is not limited to a "sale" of receivables, i.e., where the conveyance of receivables from one entity to another entity is performed utilizing a sale of the receivables. Rather, in accordance with the method of the invention, the conveyance may also be in the form of a lease, an assignment or license, for example, or any other type of conveyance from one entity to another entity.

If the conveyance is in the form of a lease, then the receivables are conveyed to a second party from a first party, in accordance with the invention, for a period of time in accordance with an understanding of the parties. At the end of this time period, the second entity may either renew the lease or return the uncollected receivables to the first entity. In such a lease situation, the various aspects of the lease including renewal provisions, the return of uncollected receivables, and other termination provisions, for example, may be negotiated between the parties and resolved in any suitable manner.

Similarly, if the conveyance is in the form of a license, then the receivables are conveyed to a second party from a first party, in accordance with the invention, for a period of time in accordance with an understanding of the parties. At the end of this time period, the second entity may either renew the license or return the uncollected receivables to the first entity, for example, depending on the nature of the license agreement. In such a license situation, the various aspects of the license including renewal provisions, the return of uncollected receivables, and other termination provisions, for example, may be negotiated between the parties and resolved in any suitable manner.

Further, it should be appreciated that the conveyance of the receivables from one entity to another may be in the form of a type of assignment. The assignment of the receivables, in accordance with an embodiment of the invention, may be effected in any suitable manner that is acceptable to the parties.

In view of the above description, it should be appreciated that the OPC process successfully addresses many of the limitations associated with conventional known processes, and also provides added benefits to the known transaction principals. Illustratively, the process of the present invention provides an optional nature to a potential buyer, as opposed to the mandatory nature that is provided by known processes. Further, the OPC process of the invention provides a planning time horizon by providing an option period. This attribute of the OPC process of the invention contrasts with the absence of a planning or option period under conventional processes. These attributes, as well as others, of the OPC process of the invention are hereinafter described in further detail vis-à-vis the conventional processes.

First, as described above, transactions utilizing conventional processes require an irrevocable agreement for specific performance between the seller and the buyer. Additionally, the buyer must, upon committing to an irrevocable purchase agreement, have funds immediately available to close the transaction. The buyer must also be operationally prepared to begin collecting the receivables. Consequently, potential buyers who cannot secure funding and/or achieve operational readiness within an immediate-term time frame are excluded from the market under conventional practices. In contrast, the OPC process of the invention provides the buyer with an extended period of time, i.e., the option period, which may be weeks, months, or even years between the commitment date and the notification date, during which the requirement to close the transaction is at the option of the buyer. As a result, the optional nature of the OPC process provides buyers with a form of default insurance which effectively removes time and performance constraints for buyers, and enables more buyers to compete for receivable sale offerings.

A further illustrative advantage of the OPC process of the invention relates to the previously described problem of capital acquisition, which causes many potential buyers to be excluded from purchasing portfolios because of insufficient time to assemble necessary capital. While borrowing is a prevalent method of capital acquisition for purchases, conventional processes deny the buyer the benefit of time to shop for the lowest cost capital and the ability to provide a lender with a clear contract defining potential collateral. Through payment of a commitment fee for purchase of portfolios well into the future, the OPC process provides buyers with both tangible collateral and an option period during which to secure financing. Alternatively, buyers may use the option period to execute sales of their own assets in order to acquire capital for purchase.

A yet further illustrative advantage of the OPC process of the invention relates to the buyer's need to manage their collection operations effectively. For reasons described above, conventional processes allow buyers very little time to adequately coordinate near-term portfolio acquisition opportunities with important operational issues such as staffing levels, computer systems, office space, or the like, for example. The planning time horizons associated with OPCs in accordance with the invention, on the other hand, provide buyers with far more time including weeks, months, or even years to plan and prepare for acquisitions.

Further, as described above, there are buyers that engage in the immediate re-sale of recently acquired receivables as a means of either lowering their overall acquisition costs or as a tactic for disposing of receivables that do not fit well in their own collection programs. The OPC process of the invention enhances the re-sale opportunity for these types of buyers, because the OPC process of the invention allows both sufficient time and information to arrange for strategic sales of selected portfolio segments. Illustratively, such information may be based on pre-defined portfolio characteristics, described earlier.

A yet further illustrative advantage of the OPC process of the invention relates to event risk, i.e., the possibility that a seller will be unable to sell a portfolio of receivables due to the availability of too few buyers and/or too many competing portfolios offered for sale at the same particular point in time. As previously described, event risk presents problems for both potential sellers and buyers that are obviated by the OPC process of the invention. Instead of having to react to near-term sales offerings, buyers who plan future purchases via OPC contracts or agreements are able to focus their time and attention on the financial and operational processes necessary to support successful long-term portfolio acquisitions and collections. Concurrently, sellers are able to avoid the event risk associated with conventional processes. Specifically, by utilizing the OPC process, sellers can commit to and plan for sales that will be delivered and funded potentially far into the future, and effectively avoid competition with near-term sales that are vying for the same buyers' acquisition dollars.

Additionally the OPC process of the invention, for example, eliminates timing and funding limitations associated with the conventional processes as described above. The OPC process in accordance with the invention enables greater numbers of buyers than currently participate in the market. More buyers will generate more competition and demand for sellers' portfolios, which in turn will improve prices paid for receivables. This is clearly of benefit to credit grantors, and by extension, to those who seek credit. As noted earlier, the ACA estimates that bad debt costs every adult in the United States more than $680 per year. Hence, any method that helps credit grantors collect or recover debt more effectively, such as the OPC process of the invention, is also of benefit to those who seek credit, and hence the overall economy, as it helps credit grantors maintain prices and/or interest rates at reasonable levels.

In accordance with a further aspect of the invention, the commitment fee paid by a buyer to a seller pursuant to an OPC contract of the invention can be interpreted as the seller's charge for contracting to hold a portfolio available for sale at a future date. Conventional processes do not provide sellers with the opportunity to receive commitment fee income from receivable sales, because sale transactions typically are consummated immediately following the principals' commitment to the transaction. The OPC process commitment fees represent incremental income not available to current sellers.

In accordance with the method of the invention as described above, the OPC process provides a method to distribute a portfolio of delinquent or charged-off receivables, of either a consumer or commercial nature, from one entity to a second entity. However, it should be appreciated that the OPC process of the invention is not limited to delinquent or charged-off receivables. That is, the OPC process of the invention may also be applied to assist in the distribution of performing receivables from one entity to a second entity. Performing receivables are receivables that are not delinquent in any way. Unlike the delinquent or charged-off receivables described herein, performing receivables are extensions of consumer or commercial credit for which the debtor has generally complied with the terms of its payment agreement with the credit grantor. Performing receivables constitute the vast majority of outstanding consumer and commercial debt in the United States. Illustratively, all banks' performing debt represented approximately 93 percent to 98 percent of all banks' outstanding consumer and commercial debt from 1985 to the present, according to the Federal Financial Institutions Examination Council.

In view of the above description of the method of the invention and in accordance with further aspects of the invention, it should be recognized that many aspects of the OPC process, in whole or in part, can be facilitated by computer based data processing systems. However, the success of the process is not wholly dependent upon this type of implementation technology. For instance, buyers, sellers, and brokers and other third party exchanges and clearinghouses, by necessity, employ computers for communication and database processing in the normal course of their business. Virtually all aspects of this invention may benefit from these types of uses of standard off-the shelf automated data processing, software programs, internet or proprietary dial-up communication systems. Brokers and other third party exchanges and clearinghouses will also benefit from this invention because they may manage many steps of the process of the invention in a manner similar to sellers or buyers, depending upon the role they play in the OPC process and/or which party they represent.

Figure 12:
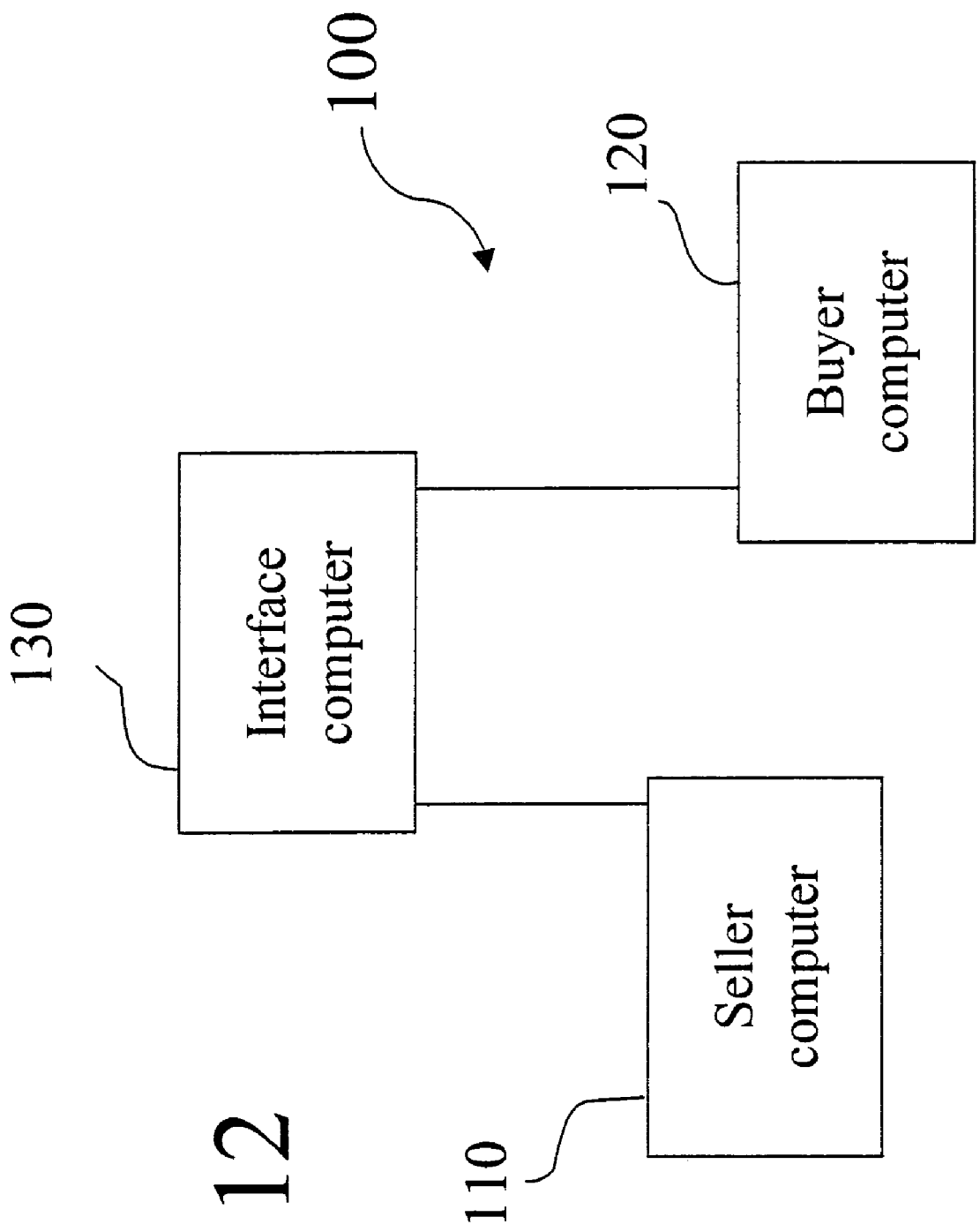
FIG. 12 is a computer arrangement which may perform the OPC process in accordance with an embodiment of the system and method of the invention.

FIG. 1 as described above shows a computer system 30 that may be used in the process of the invention. However, any suitable computer system may be used. In accordance with a further embodiment of the invention, FIG. 12 shows an illustrative computer arrangement 100. The computer arrangement 100 may utilize the OPC process of the invention as described above. As shown in FIG. 12, the computer arrangement 100 includes a seller computer 110 and a buyer computer 120. The computer arrangement 100 also includes an interface computer 130. The interface computer 130, the seller computer 110 and the buyer computer 120 may be in communication in any suitable manner. Illustratively, the computers 110, 120 and 130 may communicate over the Internet, by using dial-up communication systems, or alternatively, the computers 110, 120 and 130 may co-exist on a network so as to be in communication with each other.

In accordance with the method of the invention, the seller computer 110 is provided with the capability to accept and process seller input information from the seller of the receivables. This seller information input by or on behalf of the seller may include any suitable information necessary or desirable to effect the sale of the receivables. Accordingly, the seller input information may include, but not be limited to, non-confidential and confidential information as described above, a desired price or price range, and a requested time frame in which the seller would like to effect the sale of the receivables.

Similarly, the buyer computer 120 is provided with the capability to accept and process buyer input information from the potential buyer of the receivables. This buyer information input by or on behalf of the buyer may include any suitable information necessary or desirable to effect the purchase of the receivables using the OPC process of the invention as described above. Accordingly, the buyer input information may include, but not be limited to, non-confidential and confidential information as described above, a desired price or price range, and a requested time frame in which the buyer would like to effect the purchase of the receivables.

As shown in FIG. 12, the computer arrangement 100 also includes an interface computer 130. In accordance with one embodiment of the invention, the interface computer 130 communicates with both of the seller computer 110 and the buyer computer 120 so as to obtain the buyer information and the seller information. Once this information is obtained by the interface computer 130, the interface computer 130 may use the information in a wide variety of ways. For example, the interface computer 130 may perform a type of matching process.

In accordance with one embodiment, the matching process performed by the interface computer 130 may be simply to match potential sellers with potential buyers. Once this match is performed by the interface computer 130, the interface computer 130 then forwards information to the seller computer 110 regarding all matched buyers. Also, once the match is performed, the interface computer 130 forwards information to the buyer computer 120 regarding all the matched sellers. Once this information is received by the buyer and seller computers 110 and 120, in accordance with this embodiment of the invention, the seller and buyer may then negotiate without the assistance of the computer arrangement 100, for example.

In accordance with a further embodiment, the matching process performed by the interface computer 130 may be not only to match potential sellers with potential buyers, but also may effect the OPC process of the invention. That is, the interface computer 130 processes seller information and buyer information to find the most suitable buyer and seller match. This information may be obtained form the seller and buyer computer 110 and 120. This matching process may be performed in any suitable manner. For example, certain criteria might be weighted more heavily than other criteria. In accordance with this embodiment of the invention, the OPC process of the invention may be completely automated with little or no human intervention. If for some reason the interface computer 130 determines that further information is required from either the seller or the buyer, the interface computer 130 may request such information from either the seller computer 110 or the buyer computer 120. Accordingly, it should be appreciated that the computer arrangement 100 may perform the entirety of the OPC process as described above, or alternatively, only a portion of the OPC process with the assistance of human intervention.

In accordance with a further embodiment of the invention, it should be appreciated that the OPC process of the invention may also use only a portion of the computer arrangement 100. For example, the seller computer 110 may input or process the seller information; and the buyer computer 120 may input or process the buyer information. Both the seller information and the buyer information may then be communicated to a human person or persons. This human person thus takes the place of the interface computer 130. Further, human beings or human intervention may take the place of any of the computers shown in FIG. 12.

In further explanation of the role that third parties play in the method of the invention, it should be appreciated that the grantor, i.e., that might be characterized as a primary grantor, performs many actions as are described in detail above. Further, these actions may be performed by an agent or other entity acting on behalf of the primary grantor. Accordingly, actions by such an agent may effectively be viewed as actions by the primary grantor or possibly primary grantors.

Similarly, it should be appreciated that the grantee, i.e., that might be characterized as a primary grantee, performs many actions as are described in detail above. Further, these actions may be performed by an agent or other entity acting on behalf of the primary grantee. Accordingly, actions by such an agent may effectively be viewed as actions by the primary grantee or possibly primary grantees.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. The foregoing disclosure is not intended to be construed or to limit the present invention or otherwise to exclude any other such embodiments, adaptations, variations, modifications and equivalent arrangements, the present invention being limited by the claims and the equivalents thereof.

What is claimed is:

1. A method for determining the distribution of receivables from a grantor to a grantee, the method comprising the steps of:

forwarding information regarding at least one receivable from a grantor to at least one potential grantee;

offering a purchase option to the potential grantee, the purchase option providing the potential grantee the right but not the obligation to purchase the receivable, the purchase option providing the grantor with an obligation to sell the receivable;

offering, by the potential grantee to the grantor, an option fee;

accepting the option fee by the grantor from the potential grantee, acceptance of the option fee by the grantor constituting an acceptance by the grantor of the purchase option from the potential grantee and thereby providing the potential grantee the right to purchase the receivable at or before the end of an option period; and wherein the offering a purchase option includes establishing a notification date, the notification date being a date on or before which the potential grantee is required by the purchase option to provide notification to the grantor regarding purchase of the receivable, wherein the option period is a time period that exists between the accepting the option fee by the grantor and the notification date.

2. A method for determining the distribution of receivables from a grantor to a grantee, the method comprising the steps of:

forwarding information regarding at least one receivable from a grantor to at least one potential grantee;

offering an option to the potential grantee, the option providing the potential grantee the right but not the obligation to acquire the receivable, the option providing the grantor with an obligation to convey the receivable;

offering, by the potential grantee to the grantor, an option fee;

accepting the option fee by the grantor from the potential grantee, acceptance of the option fee by the grantor constituting an acceptance by the grantor of the option from the potential grantee and thereby providing the potential grantee the right to acquire the receivable at or before the end of an option period; and wherein the offering an option includes establishing a notification date, the notification date being a date on or before which the potential grantee is required by the option to provide notification to the grantor regarding acquisition of the receivable, wherein the option period is a time period that exists between the accepting the option fee by the grantor and the notification date.

3. The method according to claim 1, wherein the at least one receivable is a collection of receivables.

4. The method according to claim 3, wherein the collection of receivables includes at least one selected from the group of charged-off consumer receivables, charged-off commercial receivables, delinquent consumer receivables and delinquent commercial receivables.

5. The method according to claim 1, wherein forwarding information regarding at least one receivable includes:
   distributing non-confidential information from the grantor to the potential grantee;
   determining if the potential grantee requested confidential information; and
   forwarding confidential information from the grantor to the potential grantee if the potential grantee requested confidential information.

6. The method according to claim 1, wherein the potential grantee offers to the grantor a purchase price offer for the receivables, along with the option fee offer, in return for the right to pay the purchase price at a later time.

7. The method according to claim 1, wherein accepting the option commitment fee by the grantee includes the steps of:
   determining information about the potential grantee; and
   determining that the information satisfies a list of requirements.

8. The method according to claim 7, wherein the list of requirements is established by the grantor.

9. The method according to claim 1, wherein the method further includes the step of forwarding, from the potential grantee to the grantor, notification regarding exercise by the potential grantee of the purchase option.

10. The method according to claim 9, wherein the notification is forwarded on or before the notification date.

11. The method according to claim 10, wherein:
   if the grantee does not wish to accept the receivables, then the notification includes the grantee communicating to the grantor that the grantee does not wish to accept the receivables; and
   if the grantee does wish to accept the receivables, then the grantee providing no communication to the grantor that the grantee accepts the receivables, thereby providing notification by the absence of any communication.

12. The method according to claim 10, wherein:
   if the grantee does wish to accept the receivables, then the notification includes the grantee communicating to the grantor that the grantee accepts the receivables; and
   if the grantee does not wish to accept the receivables, then the grantee providing no communication to the grantor that the grantee does not accept the receivables, thereby providing notification of such non-acceptance by the absence of any communication.

13. The method according to claim 10, wherein:
   if the grantee does wish to accept the receivables, then the notification includes the grantee communicating to the grantor that the grantee accepts the receivables; and
   if the grantee does not wish to accept the receivables, then the notification includes the grantee communicating to the grantor that the grantee does not wish to accept the receivables.

14. The method according to claim 10, wherein the notification is either an acceptance by the potential grantee, such that the potential grantee becomes a committed grantee, or a non-acceptance by the potential grantee, such that the potential grantee does not become a committed grantee.

15. The method according to claim 14, wherein the grantee pays the purchase price and the receivables are conveyed from the grantor to the grantee.

16. The method according to claim 14, wherein the committed grantee fails to pay a purchase price for the receivables, the method then further including the committed grantee paying a non-compliance fee to the grantor.

17. The method according to claim 14, wherein the committed grantee pays a purchase price to the grantor and thereafter the grantor fails to deliver the receivables to the committed grantee, the method then further including the grantor refunding the purchase price, refunding the option commitment fee, and paying a non-compliance fee to the committed grantee.

18. The method according to claim 10, wherein the notification is a refusal by the potential grantee, such that the potential grantee loses the option to purchase the receivables.

19. The method according to claim 18, wherein the potential grantee relinquishes and the grantor retains an option commitment fee.

20. The method according to claim 1, wherein the potential grantee fails to provide notification to the grantor by the notification date and, as a result, the grantor retains the option commitment fee.

21. The method according to claim 1, wherein the grantor is a seller and the potential grantee is a buyer.

22. The method according to claim 1, further including the step of determining the amount of the option fee based on the length of the option period.

23. The method according to claim 22, further including increasing the option fee as the length of the option period increases.

24. The method according to claim 1, wherein the forwarding information regarding at least one receivables from a grantor to at least one potential grantee step is performed utilizing a computer.

25. The method according to claim 24, wherein the computer is a grantor computer, and the grantor computer is in communication with a grantee computer, the grantee computer under the control of the grantee.

26. The method according to claim 1, wherein the offering a purchase option to the potential grantee step is performed utilizing a computer.

27. The method according to claim 26, wherein the computer is a grantee computer, and the grantee computer is in communication with a grantor computer, the grantor computer under the control of the grantor.

28. The method according to claim 1, wherein a computer determines the amount of the option fee, the computer determining the option fee based on the information regarding at least one receivables and terms of the purchase option.

29. The method of claim 28, wherein the computer utilizes a computer program.

30. The method according to claim 1, wherein the grantor includes a primary grantor and a third party acting in conjunction with the primary grantor.

31. The method according to claim 30, wherein the third party is an agent of the primary grantor.

32. The method according to claim 1, wherein the grantee includes a primary grantee and a third party acting in conjunction with the primary grantee.

33. The method according to claim 32, wherein the third party is an agent of the primary grantee.

34. The method of claim 1, wherein the option period is the entirety of the time period between accepting the option fee by the grantor and the notification date.

35. The method according to claim 1, wherein exercise by the potential grantee of the purchase option includes acceptance of the purchase option or refusal of the purchase option.

36. The method of claim 1, wherein the at least one receivable is one of a charged-off consumer receivable and a charged-off commercial receivable.

37. The method of claim 1, wherein the at least one receivable is a delinquent receivable.

38. A method for determining the distribution of receivables from a grantor to a grantee, the grantee initiating the distribution, the method comprising the steps of:
  forwarding information regarding desired receivables from a grantee to at least one potential grantor;
  offering a purchase option to the potential grantor, the purchase option providing the grantee the right but not the obligation to purchase the receivables, the purchase option providing the potential grantor with an obligation to sell the receivables;
  offering, by the grantee to the potential grantor, an option fee;
  accepting the option fee by the potential grantor from the grantee, acceptance of the option fee by the potential grantor constituting an acceptance by the potential grantor of the purchase option from the grantee and thereby providing the grantee the right to purchase the receivables at or before the end of an option period; and
  wherein the offering a purchase option includes establishing a notification date, the notification date being a date on or before which the grantee is required by the purchase option to provide notification to the potential grantor regarding purchase of the receivables, wherein the option period is a time period that exists between the accepting the option fee by the potential grantor and the notification date.

39. The method according to claim 38, wherein the method further includes the step of forwarding, from the grantee to the grantor, notification regarding exercise by the grantee of the purchase option.

40. The method according to claim 39, wherein the notification is forwarded on or before the notification date.

41. The method according to claim 40, wherein the notification is either an acceptance by the grantee, such that the grantee becomes a committed grantee, or a declination by the grantee, such that the grantee does not become a committed grantee.

42. A method for determining the distribution of receivables from a lessor to a lessee, the receivables being available for leasing to the lessee, the method comprising the steps of:
  forwarding information regarding at least one receivable from a lessor to at least one potential lessee;
  offering a lease option to the potential lessee, the lease option providing the potential lessee the right but not the obligation to lease the receivables, the lease option providing the lessor with an obligation to lease the receivables;
  offering, by the potential lessee to the lessor, an option fee;
  accepting the option fee by the lessor from the potential lessee, acceptance of the option fee by the lessor constituting an acceptance by the lessor of the lease option from the potential lessee and thereby providing the potential lessee the right to lease the receivables at or before the end of an option period; and
  wherein the offering a lease option includes establishing a notification date, the notification date being a date on or before which the potential lessee is required by the lease option to provide notification to the lessor regarding leasing the receivables, wherein the option period is a time period that exists between the accepting the option fee by the lessor and the notification date.

43. A method for determining the distribution of receivables from an assignor to an assignee, the receivables being available for assignment to the assignee, the method comprising the steps of:
  forwarding information regarding at least one receivables from an assignor to at least one potential assignee;
  offering an assignment option to the potential assignee, the assignment option providing the potential assignee the right but not the obligation to receive an assignment of the receivables, the assignment option providing the assignor with an obligation to assign the receivables;
  offering, by the potential assignee to the assignor, an option fee;
  accepting the option fee by the assignor from the potential assignee, acceptance of the option fee by the assignor constituting an acceptance by the assignor of the assignment option from the potential assignee and thereby providing the potential assignee the right to receive an assignment of the receivables at or before the end of an option period; and
  wherein the offering an assignment option includes establishing a notification date, the notification date being a date on or before which the potential assignee is required by the assignment option to provide notification to the assignor regarding receiving an assignment of the receivables, wherein the option period is a time period that exists between the accepting the option fee by the assignor and the notification date.

44. A method for determining the distribution of receivables from an licensor to an licensee, the receivables being available for license to the licensee, the method comprising the steps of:
  forwarding information regarding at least one receivables from a licensor to at least one potential licensee;
  offering an license option to the potential licensee, the license option providing the potential licensee the right but not the obligation to receive a license of the receivables, the license option providing the licensor with an obligation to license the receivables;
  offering, by the potential licensee to the licensor, an option fee;
  accepting the option fee by the licensor from the potential licensee, acceptance of the option fee by the licensor constituting an acceptance by the licensor of the license option from the potential licensee and thereby providing the potential licensee the right to receive a license of the receivables at or before the end of an option period; and wherein the offering a license option includes establishing a notification date, the notification date being a date on or before which the potential licensee is required by the license option to provide notification to the licensor regarding receiving a license of the receivables, wherein the option period is a time period that exists between the accepting the option fee by the licensor and the notification date.

45. A computer implemented method for determining the distribution of receivables from a grantor to a grantee, the method comprising the steps of:

obtaining grantor information regarding at least one receivable from a grantor;

obtaining grantee information regarding at least one desired receivable from a grantee;

matching the grantee with the grantor, the matching being based on the grantor information and the grantee information;

offering an option to the potential grantee, the option providing the potential grantee the right but not the obligation to acquire the receivable, the option providing the grantor with an obligation to convey the receivable to the grantee;

offering an option fee from the potential grantee to the grantor;

determining acceptance of the option fee by the grantor from the potential grantee, acceptance of the option fee by the grantor constituting an acceptance by the grantor of the option from the potential grantee and thereby providing the potential grantee the right to acquire the receivable at or before the end of an option period; and wherein the offering an option includes establishing a notification date, the notification date being a date on or before which the potential grantee is required by the option to provide notification to the grantor regarding acquisition of the receivable.

46. The computer implemented method according to claim 45, wherein the option period is a time period between the accepting the option fee by the grantor and the notification date.

47. The computer implemented method according to claim 45, wherein the method is performed using a grantor computer and a grantee computer.

48. The computer implemented method according to claim 47, wherein the method is performed using an interface computer that interfaces with the grantor computer and the grantee computer.

49. A computer-based system for determining distribution of receivables, comprising:

a means for forwarding information regarding at least one receivable from a grantor to at least one potential grantee;

a means for offering a purchase option to the potential grantee, the purchase option providing the potential grantee the right but not the obligation to purchase the receivable, the purchase option providing the grantor with an obligation to sell the receivable;

a means for offering, by the potential grantee to the grantor, an option fee;

a means for accepting the option fee by the grantor from the potential grantee, acceptance of the option fee by the grantor constituting an acceptance by the grantor of the purchase option from the potential grantee and thereby providing the potential grantee the right to purchase the receivable at or before the end of an option period; and wherein the offering a purchase option includes establishing a notification date, the notification date being a date on or before which the potential grantee is required by the purchase option to provide notification to the grantor regarding purchase of the receivable, wherein the option period is a time period that exists between the accepting the option fee by the grantor and the notification date.

50. The computer-based system of claim 49, wherein the receivable is a delinquent receivable.

51. The computer-based system of claim 49, wherein the receivable is an unpaid credit.

* * * * *